(12) United States Patent
Park et al.

(10) Patent No.: US 10,367,221 B2
(45) Date of Patent: Jul. 30, 2019

(54) DISTRIBUTED ENERGY STORAGE SYSTEM

(71) Applicant: The Curators of the University of Missouri, Columbia, MO (US)

(72) Inventors: Jonghyun Park, Rolla, MO (US); Mohammed Al-Yasiri, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 435 days.

(21) Appl. No.: 15/210,405

(22) Filed: Jul. 14, 2016

(65) Prior Publication Data

US 2018/0019495 A1  Jan. 18, 2018

(51) Int. Cl.
| | | |
|---|---|---|
| *H01M 8/18* | (2006.01) | |
| *H01M 8/20* | (2006.01) | |
| *H01M 8/00* | (2016.01) | |
| *H01M 8/0271* | (2016.01) | |
| *H01M 4/96* | (2006.01) | |
| *H01M 8/1004* | (2016.01) | |
| *H01M 8/1023* | (2016.01) | |
| *B60K 1/04* | (2019.01) | |
| *H01M 8/1039* | (2016.01) | |

(52) U.S. Cl.
CPC ............ *H01M 8/188* (2013.01); *B60K 1/04* (2013.01); *H01M 4/96* (2013.01); *H01M 8/004* (2013.01); *H01M 8/0271* (2013.01); *H01M 8/1004* (2013.01); *H01M 8/1023* (2013.01); *H01M 8/20* (2013.01); *B60K 2001/0438* (2013.01); *H01M 8/1039* (2013.01); *H01M 2250/20* (2013.01); *H01M 2300/0082* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 5,665,212 A | 9/1997 | Zhong et al. | |
| 8,343,646 B1 * | 1/2013 | Wilkins | H01M 8/188 429/105 |

OTHER PUBLICATIONS

Journal of Power Sources, Martha Schreiber et al., Practical and commercial issues in the design and manufacture of vanadium flow batteries, journal homepage: www.elsevier.com/locate/jpowsour, Journal of Power Sources 206 (2012) 483-489.
Composite Structures, K.H. Kim et al., Development of carbon composite bipolar plate (BP) for vanadium redox flow batter (VRFB), journal homepage: www.elsevier.com/locate/compstruct, Composite Structures 109 (2014) 253-259.
Advanced Functional Materials, Wei Wang et al., Recent Progress in Redox Flow Battery Research and Development, www.afm-journal.de, © 2012 Wiley-VCH Verlag GmbH & Co. KGaA, Weinheim, wileyonlinelibrary.com, pp. 1-17.
Journal of Power Sources, Peng Qian et al., A novel electrode-bipolar plate assembly for vanadium redox flow battery applications, journal homepage: www.elsevier.com/locate/jpowsour, Journal of Power Sources 175 (2008) 613-620.
Composite Structures, Soohyun Nam et al., Nano carbon/fluoroelastomer composite bipolar plate for a vanadium redox flow battery (VRFB), journal homepage: www.elsevier.com/locate/compstruct, Composite Structures 159 (2017) 220-227.
Composite Structures, Jun Woo Lim et al., "Accepted Manuscript" Carbon fiber/polyethylene bipolar plate-carbon felt electrode assembly for vanadium redox flow batteries (VRFB), Composite Structures (2015), doi: http://dx.doi.org/10.1016/http://dx.doi.org/http://dx.doi.org/10.1016/j.compstruct.2015.08.057, 35 pages.
Journal of Materials Chemistry A, Minjoon Park et al., Material selection and optimization for highly stable composite bipolar plates in a vanadium redox flow batteries, J. Mater. Chem. A, Feb. 2014, 15808-15815 © The Royal Society of Chemistry 2014.
RSC Advances, Puiki Leung et al., Progress in redox flow batteries, remaining challenges and their applications in energy storage, RSC Advances, Feb. 2012, 10125-10156.
J Appl Electrochem, Doug Aaron et al., Polarization curve analysis of all-vanadium redox flow batteries, J Appl Electrochem (2011) 41:1175-1182.
U.S. Department of Energy, EV Everywhere, Grand Challenge Blueprint, Jan. 31, 2013, 16 pages, http://energy.gov/sites/prod/files/2016/05/f31/eveverywhere_blueprint.pdf.
U.S. Department of Energy, EV Everywhere Grand Challenge Road to Success, Jan. 2014, 16 pages, http://energy.gov/sites/prod/files/2014/02/f8/eveverywhere_road_to_success.pdf.

* cited by examiner

*Primary Examiner* — Ladan Mohaddes
(74) *Attorney, Agent, or Firm* — Stinson LLP

(57) ABSTRACT

An energy storage system reaction cell configured for distribution throughout a transport system. The length of the reaction cell is substantially greater than its width and is looped throughout the transport system in a serpentine configuration. A membrane within the reaction cell has a length substantially equal to the length of the reaction cell such that surface area of the membrane is maximized relative to volume of the reaction cell to increase electrical power provided to an electrical load of the transport system.

20 Claims, 34 Drawing Sheets

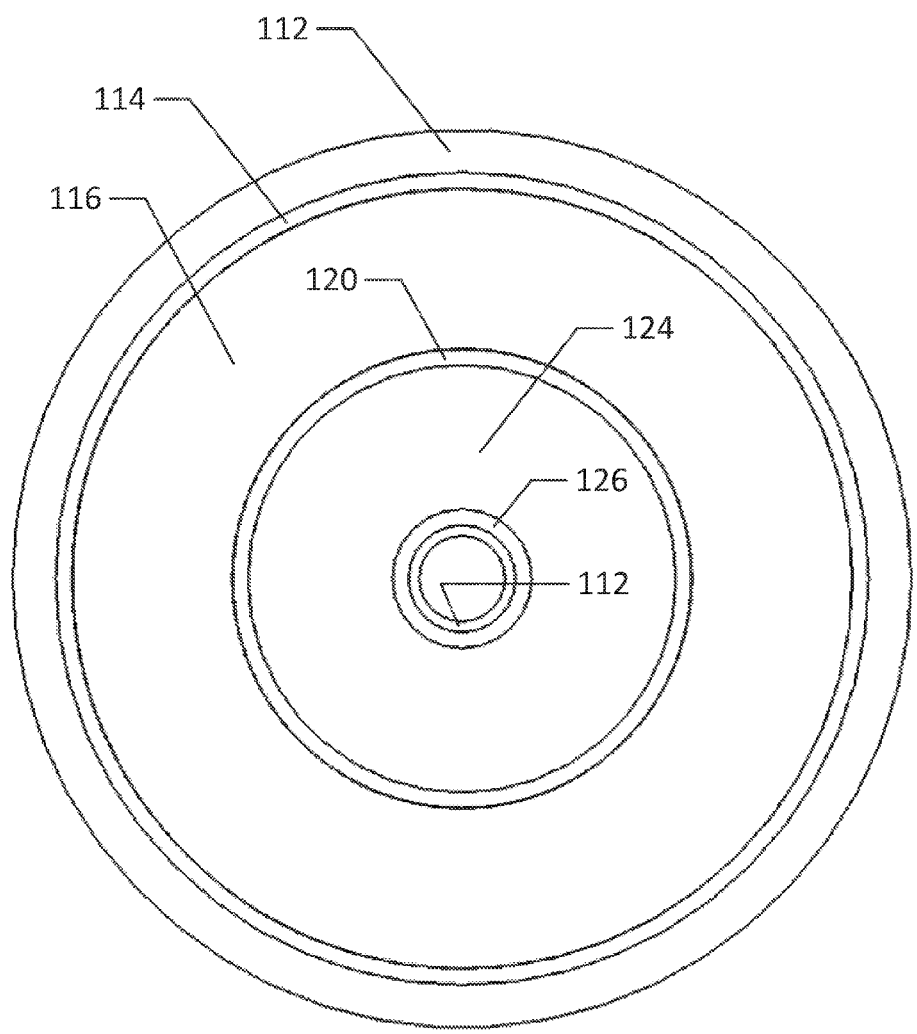

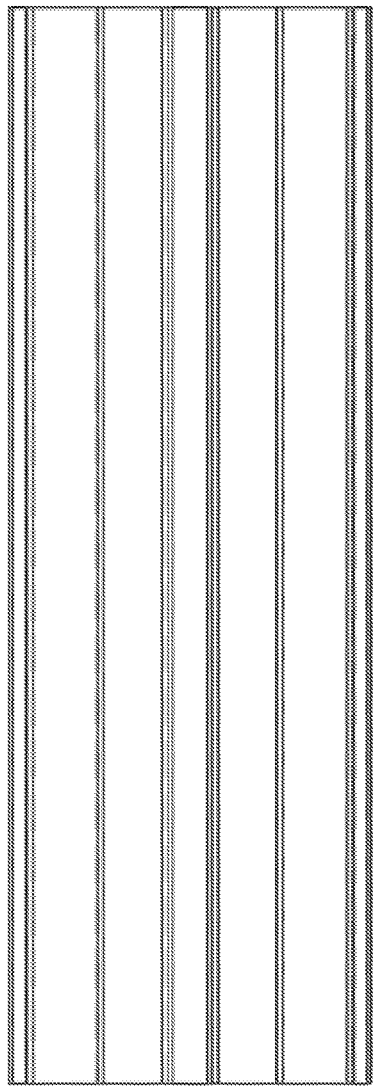
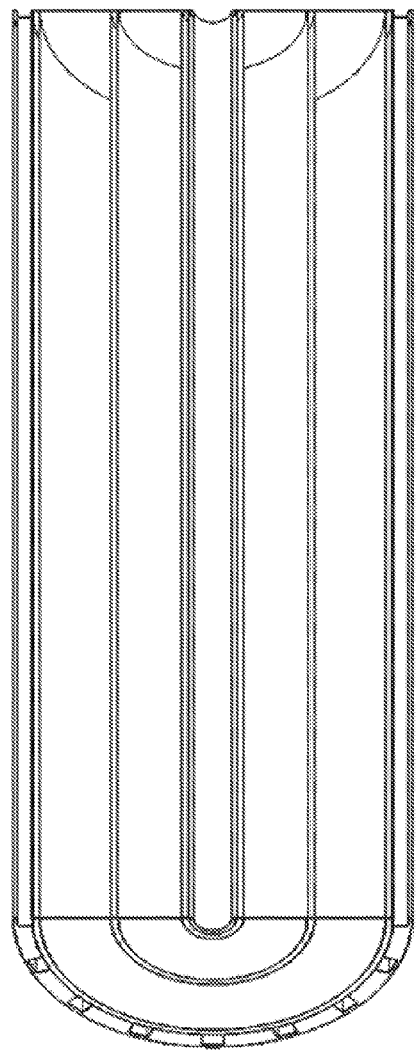
FIG. 9C
FIG. 9D

DISTRIBUTED ENERGY STORAGE SYSTEM

BACKGROUND

Aspects of the present invention generally relate to energy storage systems for transport systems, such as electric vehicles, robots, and the like. More particularly, aspects of the present invention relate to energy storage systems configured for distribution throughout a system.

Conventional transport systems utilize lithium-ion batteries for energy storage. Disadvantages of lithium-ion batteries include lengthy recharge times, bulkiness, and relatively short life due to mechanical and/or chemical degradation. Moreover, lithium-ion batteries require increasingly large physical sizes (e.g., volume) for adequate power generation for vehicles or the like because energy and power are dependent on each other.

Although conventional flow batteries provide advantages compared to lithium-ion batteries, including long cycle life, separation of energy and power ratings, and availability of deep discharge, they are too bulky and provide insufficient power for use in transport systems. Flow batteries include reaction cells within a confined volume, such as channels within a metallic, graphite, or composite plate. Increasing membrane surface area in the plate to increase power results in added weight from the additional material in the plate and increases the volume of the reaction cell. Utilizing these bulky reaction cells in a transport system would result inefficient space utilization, as well as unequal weight distribution. In other words, conventional flow batteries may be well-suited for stationary applications but are too heavy and bulky for utilization in transitory environments, such as electric vehicles and the like.

SUMMARY

Aspects of the invention utilize flow battery reaction cells configured for distribution throughout a transport system to increase electrical power by maximizing membrane surface area relative to reaction cell volume. Further aspects of the invention utilize a small space in a transport system relative to lithium-ion batteries and conventional flow batteries.

In an aspect, an energy storage system includes two tanks, an elongate reaction cell, and two pumps. One of the tanks is configured for storing an anolyte while the other tank is configured for storing a catholyte. The elongate reaction cell can be distributed throughout a transport system. The reaction cell includes an anode electrode in fluid communication with the first tank and a cathode electrode in fluid communication with the second tank. The reaction cell further includes a membrane configured to form an interface between the anode electrode and cathode electrode. One of the pumps is configured for pumping the anolyte from the first tank through the anode electrode of the reaction cell via a first input supply tube. The other pump is configured for pumping the catholyte from the second tank through the cathode electrode of the reaction cell via a second input supply tube. A length of the reaction cell is substantially greater than a width of the reaction cell. Moreover, the membrane has a length substantially equal to the length of the reaction cell such that surface area of the membrane is maximized relative to volume of the reaction cell.

In another aspect, an electrochemical reaction cell includes an anode electrode, a cathode electrode, a membrane, and an exterior flexible polymer sheath enveloping the anode electrode, the cathode electrode, and the membrane. The anode electrode is configured to receive and fluidly communicate an anolyte, and the cathode electrode is configured to receive and fluidly communicate a catholyte. The membrane is configured to form an interface between the anode electrode and the cathode electrode. A length of the electrochemical reaction cell is substantially greater than its width. The electrochemical reaction cell is moreover configured for winding throughout a transport system to provide greater surface area of the membrane relative to the volume of the electrochemical reaction cell.

In yet another aspect, a transport system includes two tanks, an elongate reaction cell that is substantially longer than it is wide, and two pumps. One of the tanks is configured for storing an anolyte and the other tank is configured for storing a catholyte. The elongate reaction cell includes an anode electrode in fluid communication with the first tank and a cathode electrode in fluid communication with the second tank. Furthermore, the reaction cell includes a membrane configured to form an interface between the anode electrode and the cathode electrode such that surface area of the membrane is maximized relative to volume of the reaction cell. A first pump of the two pumps is configured for pumping the anolyte from the first tank through the anode electrode of the reaction cell via a first supply tube that couples the first tank and the reaction cell. A second pump of the two pumps is configured for pumping the catholyte from the second tank through the cathode electrode of the reaction cell via a second supply tube that couples the second tank and the reaction cell. The reaction cell is distributed throughout the transport system in a serpentine configuration within an area defined by the width and length of the transport system.

Other objects and features will be in part apparent and in part pointed out hereinafter.

BRIEF DESCRIPTION OF THE DRAWINGS

FIG. 7B is a cross-sectional view of the exemplary reaction cell configuration illustrated in FIG. 7A in the XY plane.

FIG. 9C is a cross-sectional view of a portion of the exemplary reaction cell configuration illustrated in FIG. 9A in the YZ plane.

FIG. 9D is a perspective view of the cross-sectional view of FIG. 9C.

Corresponding reference characters indicate corresponding parts throughout the drawings.

DETAILED DESCRIPTION

Figure 1:
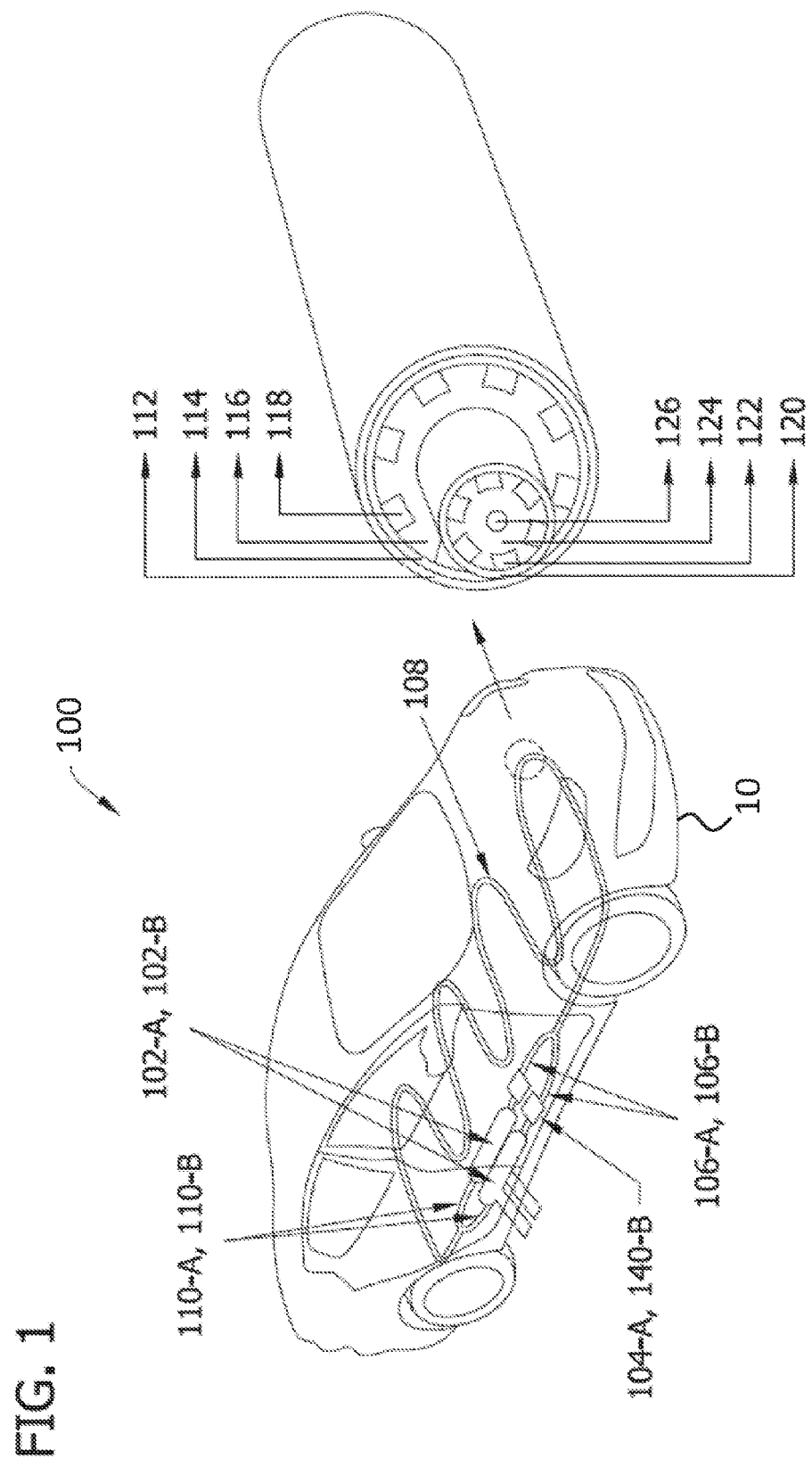
FIG. 1 illustrates an exemplary energy storage system and an exemplary transport system within which aspects of the invention may be incorporated.
Figure 2A:
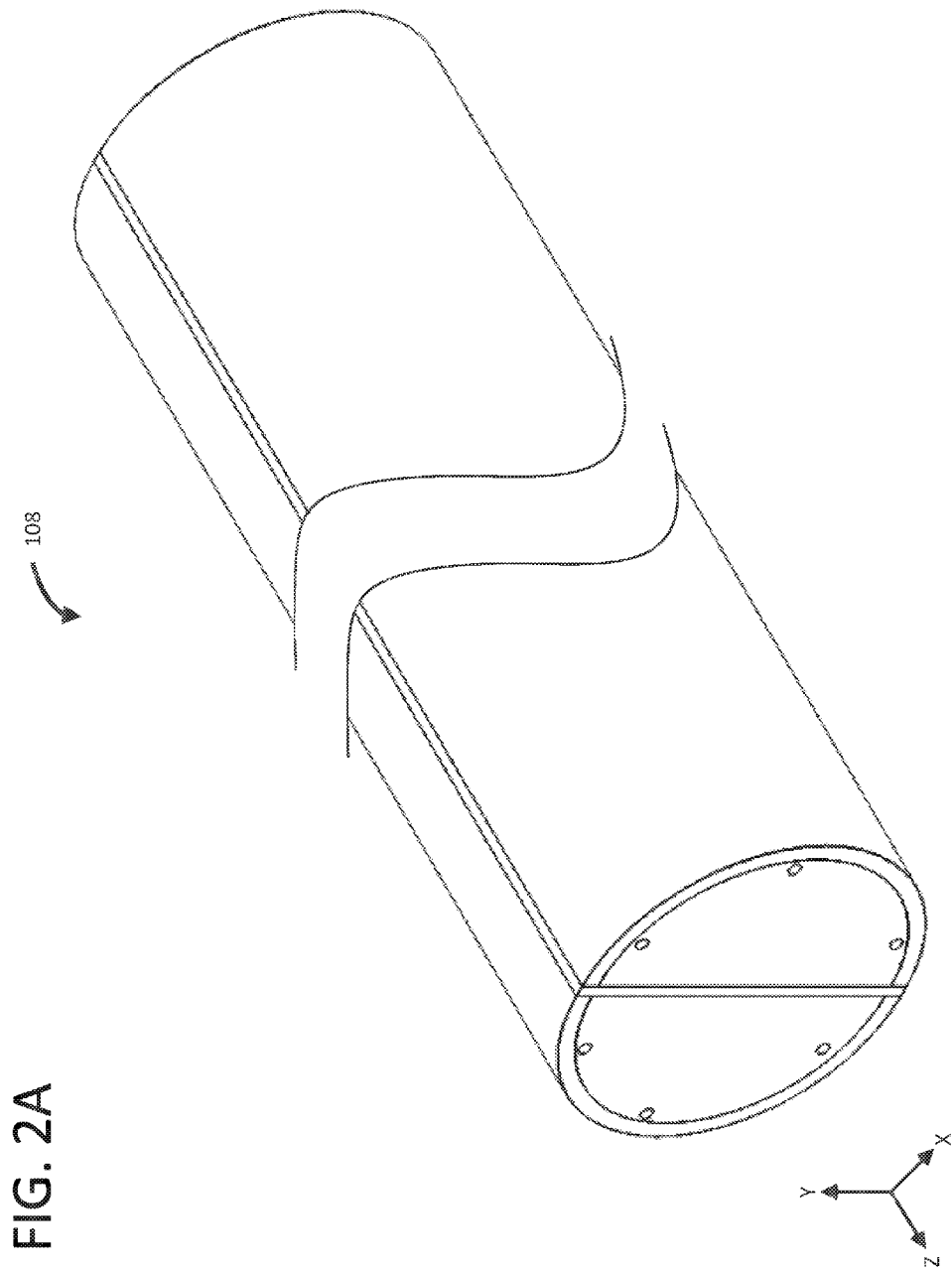
FIG. 2A is a perspective view of a portion of an exemplary reaction cell configuration according to an embodiment of the invention.
Figure 2B:
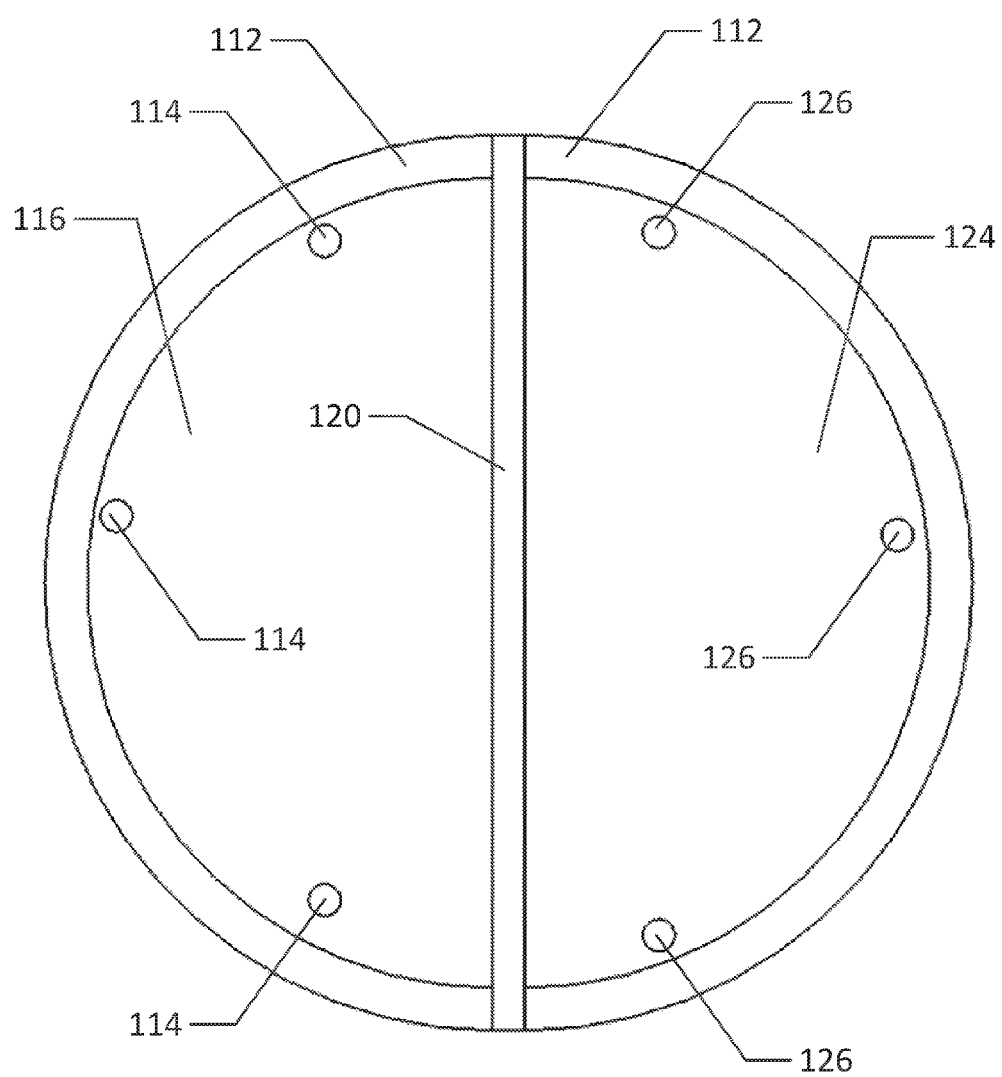
FIG. 2B is a cross-sectional view of the exemplary reaction cell configuration illustrated in FIG. 2A in the XY plane.
Figure 2C:
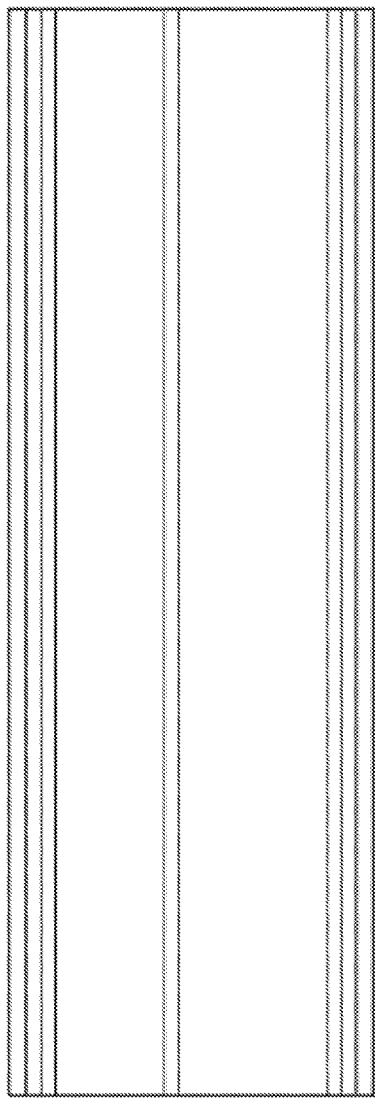
FIG. 2C is a cross-sectional view of a portion of the exemplary reaction cell configuration illustrated in FIG. 2A in the YZ plane.
Figure 2D:
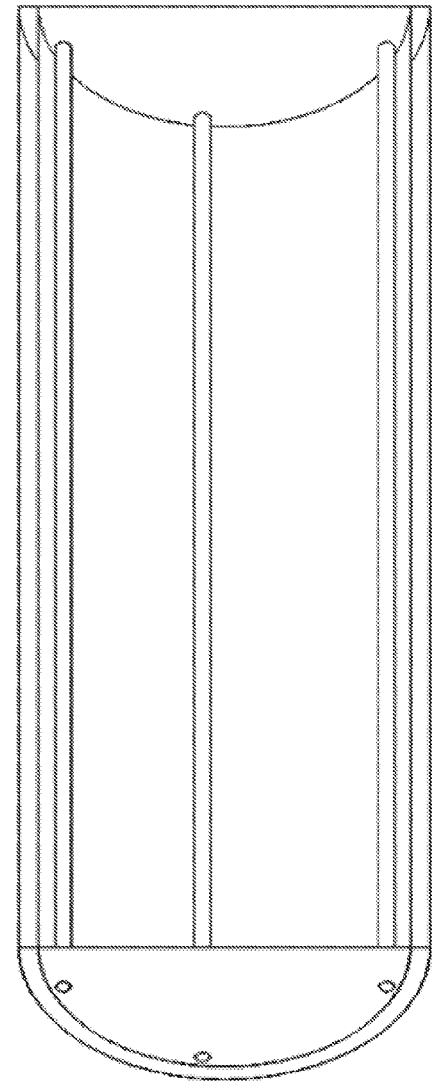
FIG. 2D is a perspective view of the cross-sectional view of FIG. 2C.
Figure 3A:
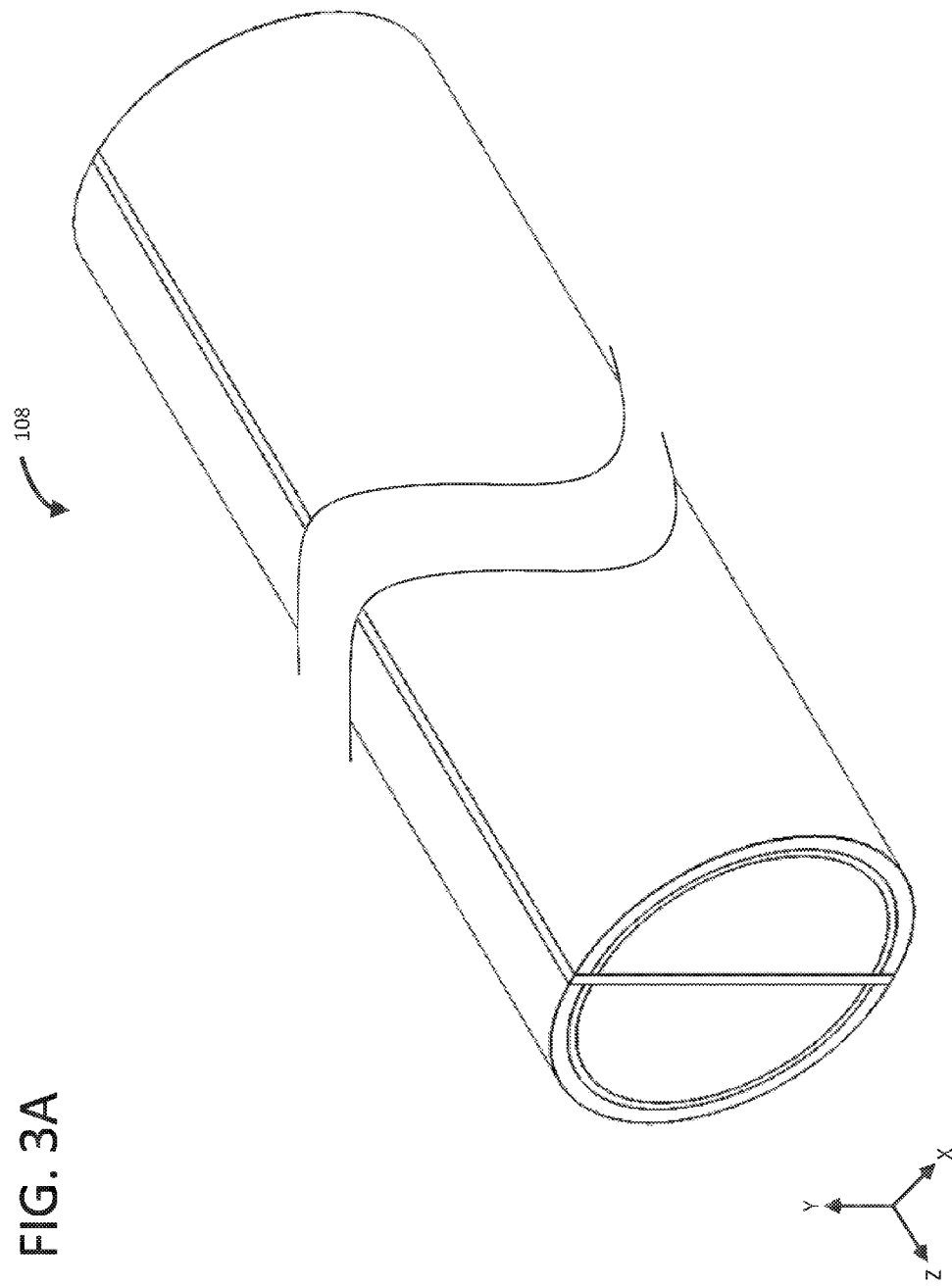
FIG. 3A is a perspective view of a portion of an exemplary reaction cell configuration according to another embodiment of the invention.
Figure 3B:
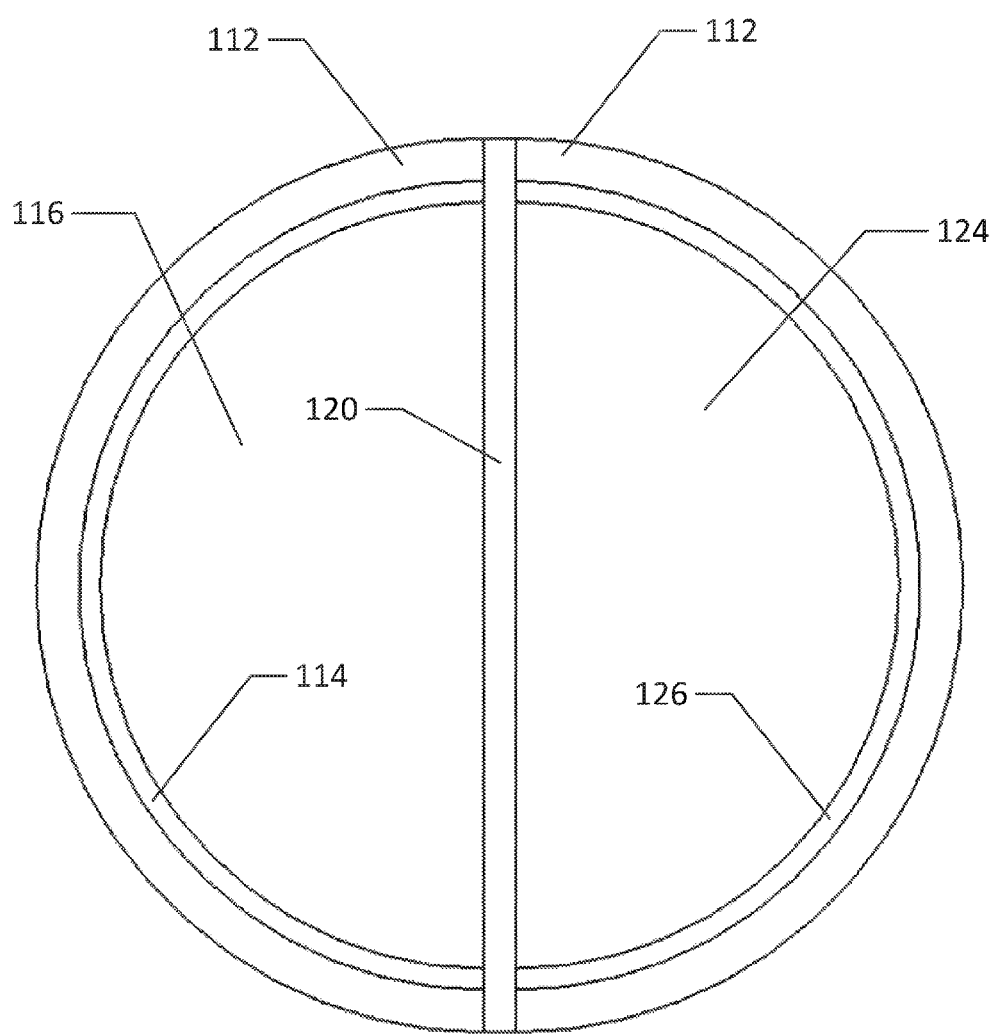
FIG. 3B is a cross-sectional view of the exemplary reaction cell configuration illustrated in FIG. 3A in the XY plane.
Figure 3C:
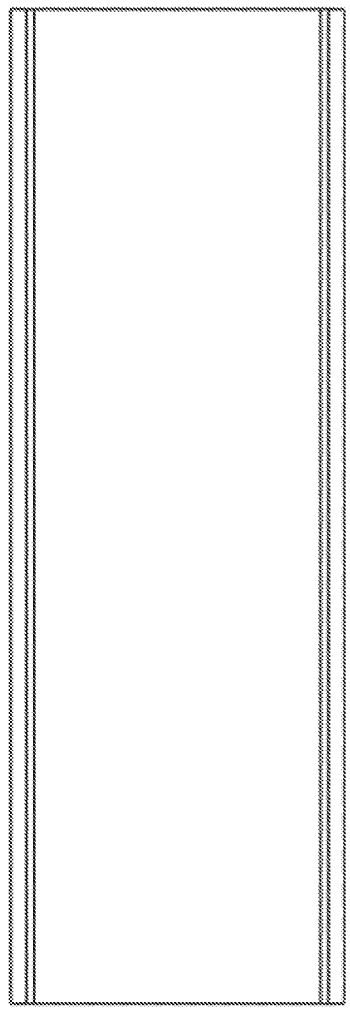
FIG. 3C is a cross-sectional view of a portion of the exemplary reaction cell configuration illustrated in FIG. 3A in the YZ plane.
Figure 3D:
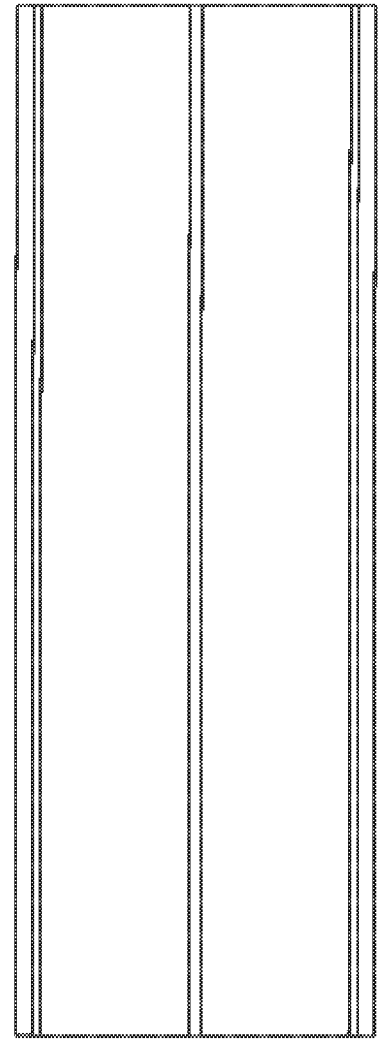
FIG. 3D is a cross-sectional view of a portion of the exemplary reaction cell configuration illustrated in FIG. 3A in the XZ plane.
Figure 4A:
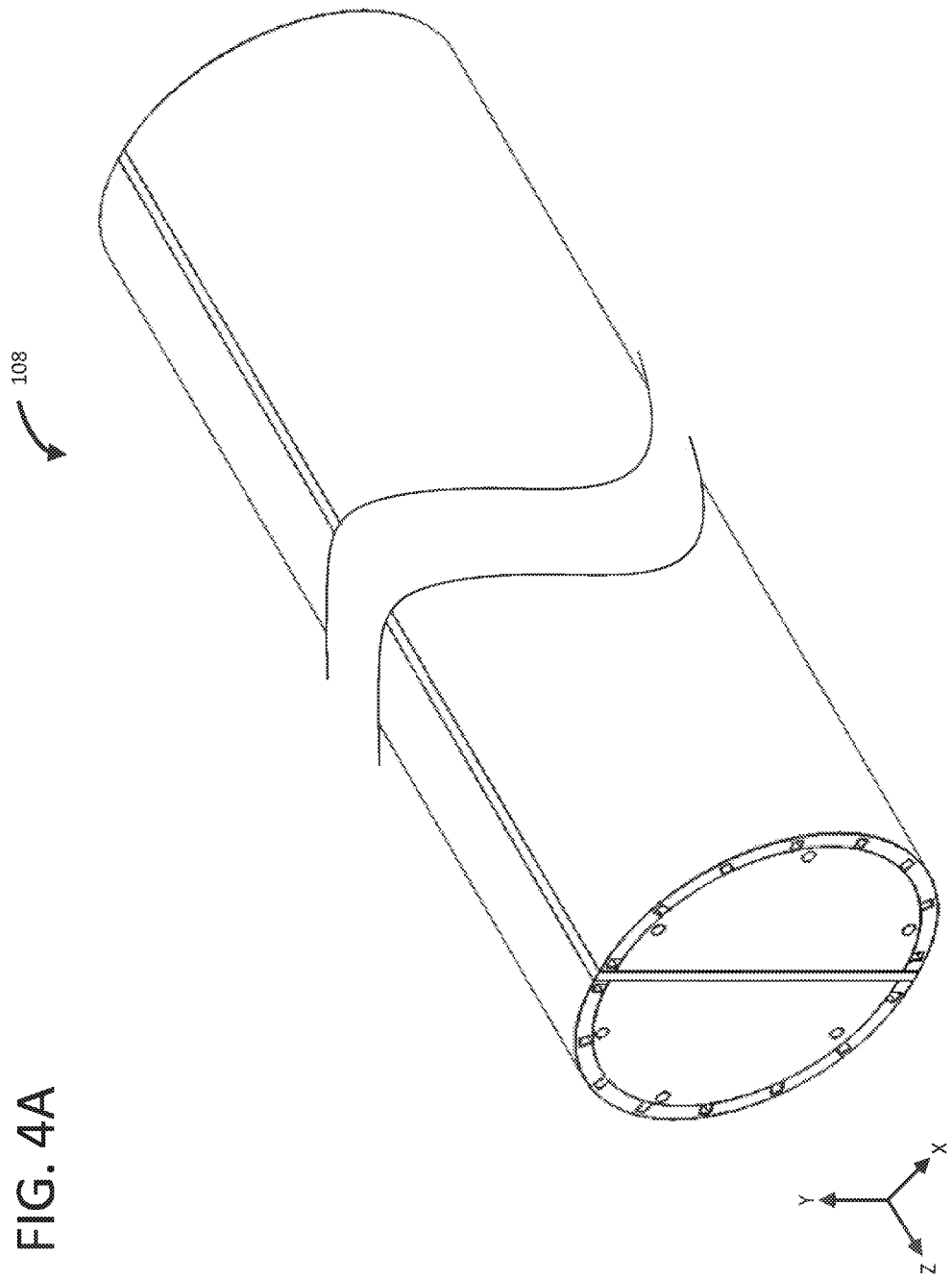
FIG. 4A is a perspective view of a portion of an exemplary reaction cell configuration according to another embodiment of the invention.
Figure 4B:
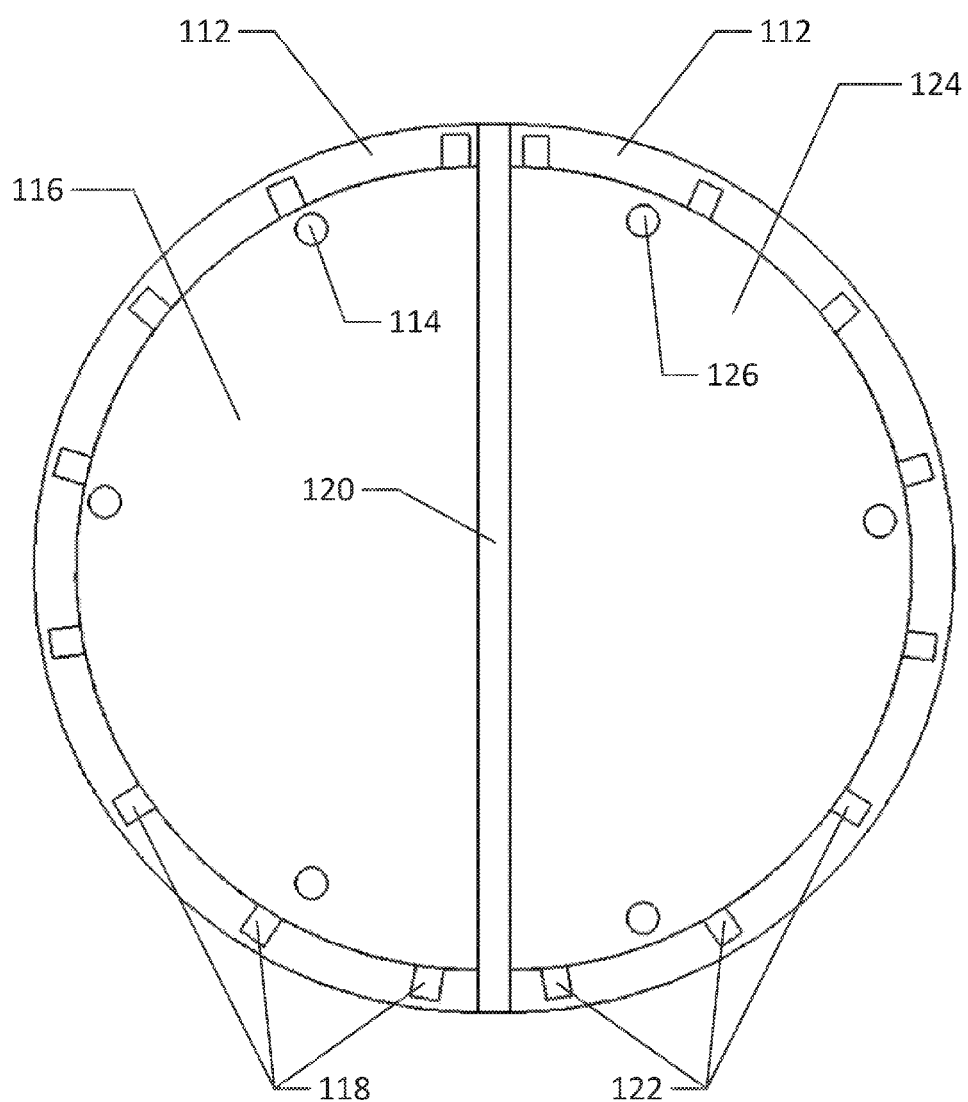
FIG. 4B is a cross-sectional view of the exemplary reaction cell configuration illustrated in FIG. 4A in the XY plane.
Figure 4C:
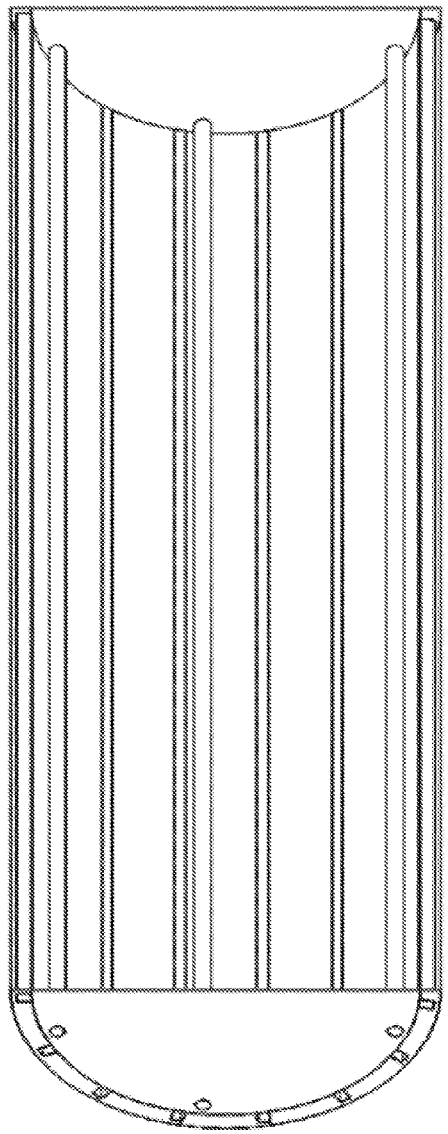
FIG. 4C is a perspective view of a cross-section of a portion of the exemplary reaction cell configuration illustrated in FIG. 4A in the YZ plane.
Figure 4D:
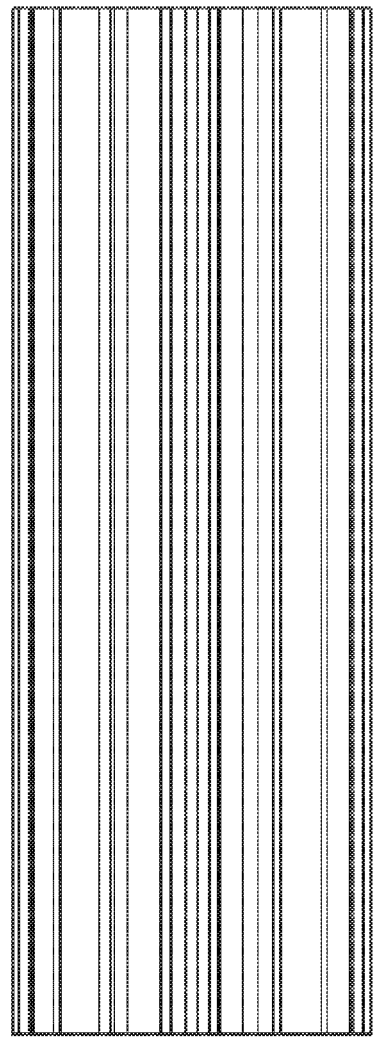
FIG. 4D is a cross-sectional view of a portion of the exemplary reaction cell configuration illustrated in FIG. 4A in the XZ plane.
Figure 4E:
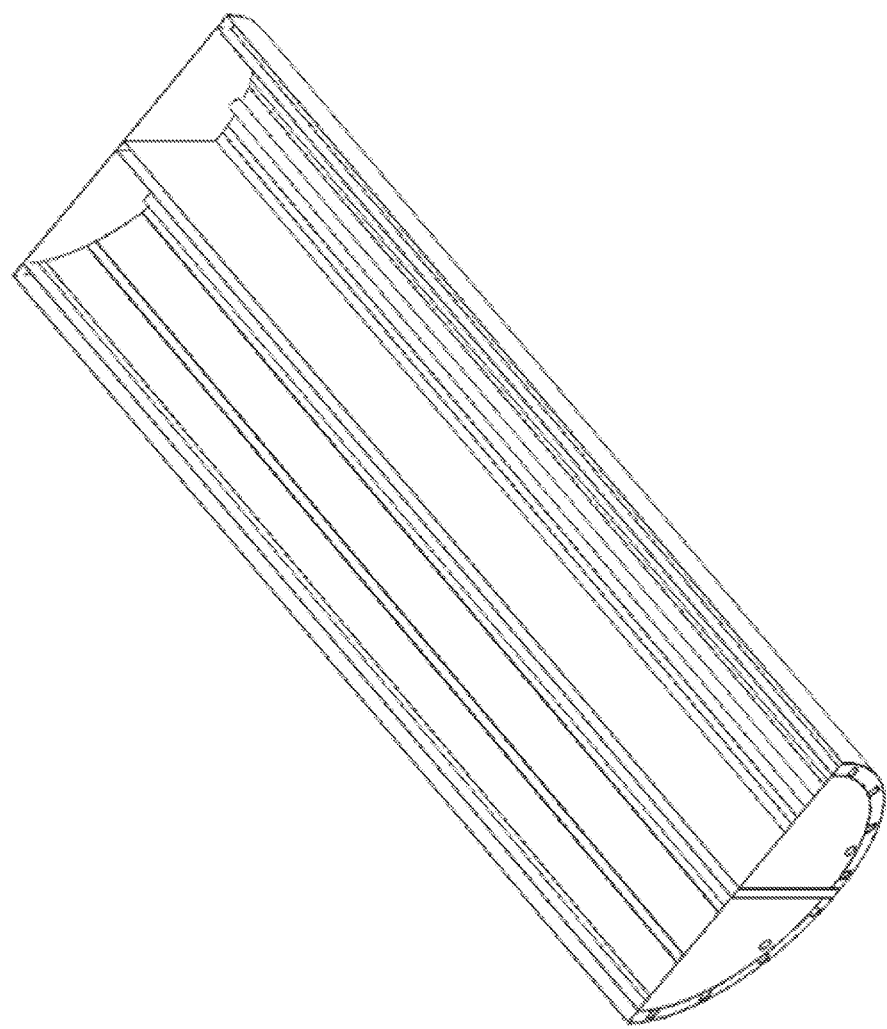
FIG. 4E is a perspective view of a portion of the cross-sectional view of FIG. 4D.
Figure 5A:
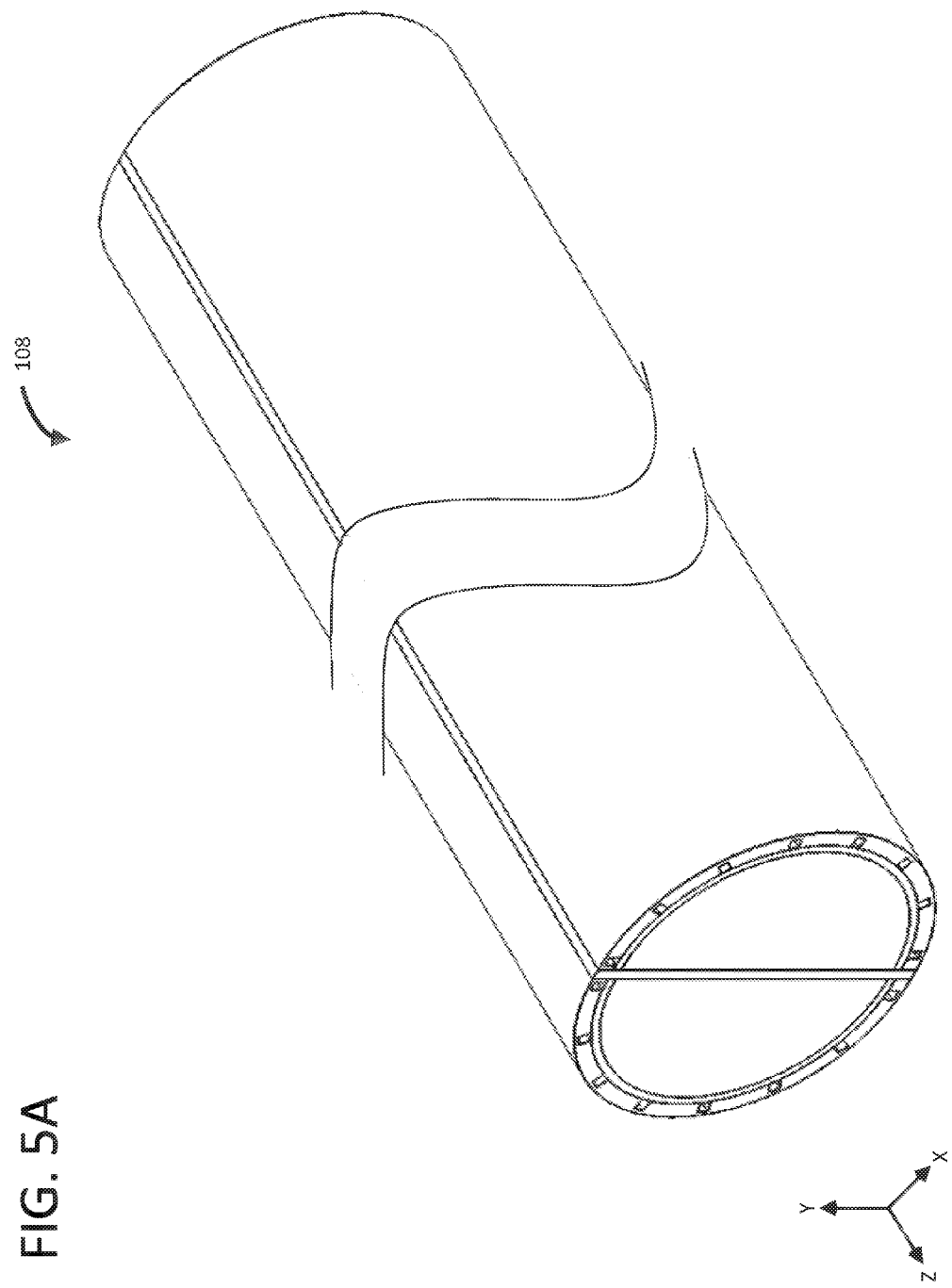
FIG. 5A is a perspective view of a portion of an exemplary reaction cell configuration according to another embodiment of the invention.
Figure 5B:
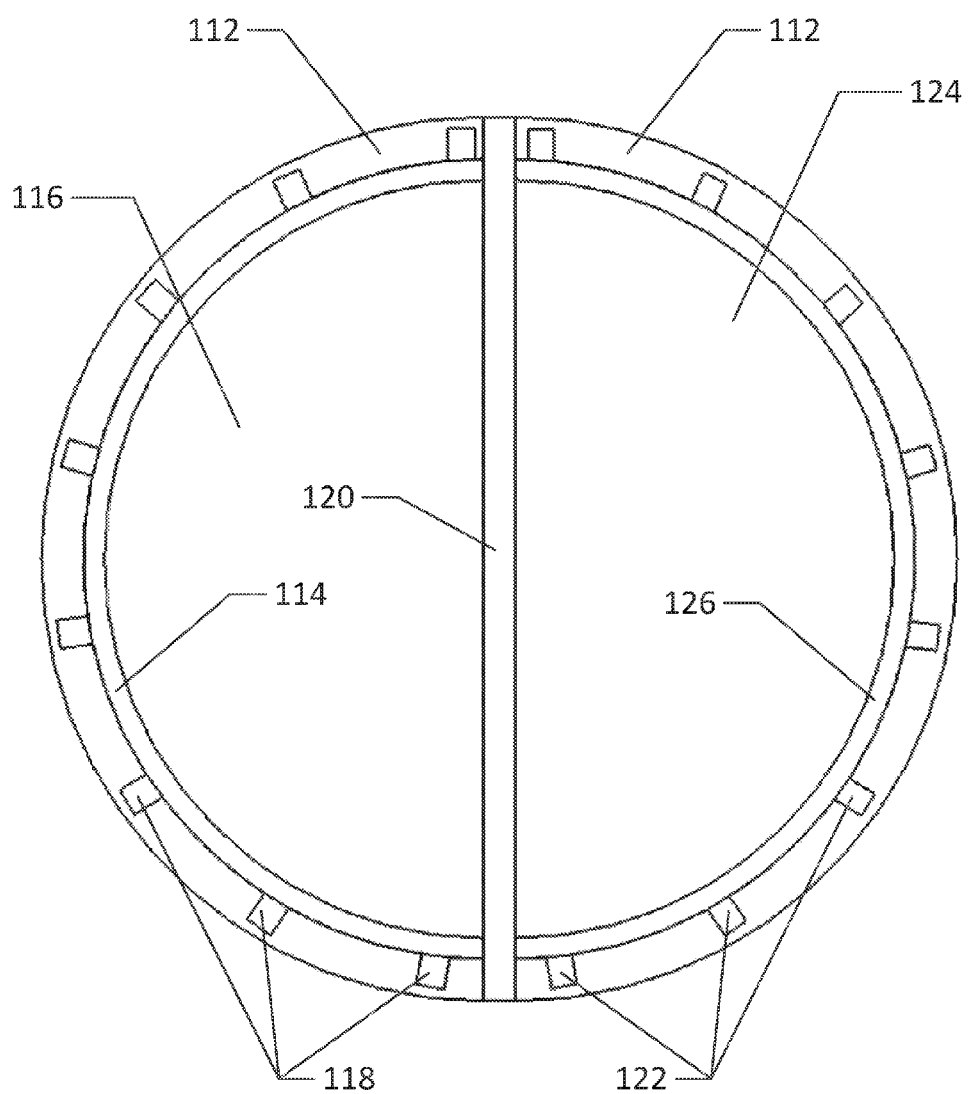
FIG. 5B is a cross-sectional view of the exemplary reaction cell configuration illustrated in FIG. 5A in the XY plane.
Figure 5C:
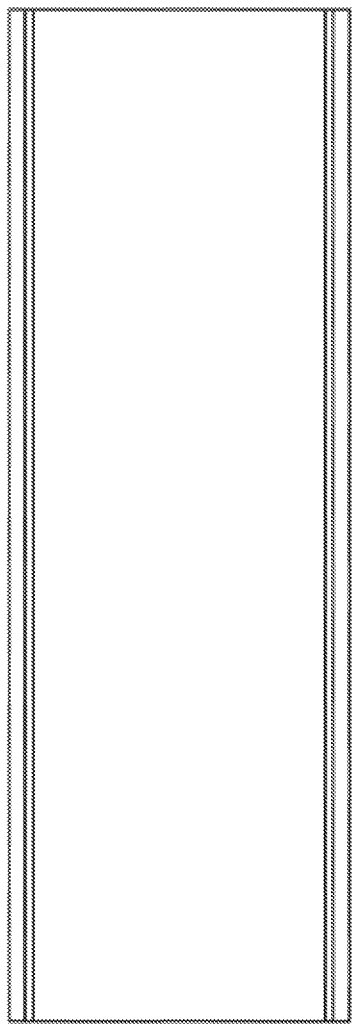
FIG. 5C is a cross-sectional view of a portion of the exemplary reaction cell configuration illustrated in FIG. 5A in the YZ plane.
Figure 5D:
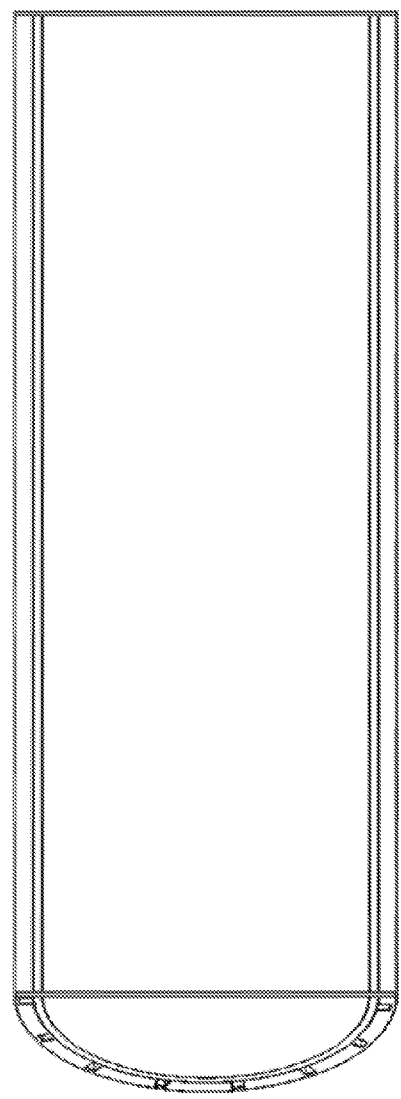
FIG. 5D is a perspective view of the cross-sectional view of FIG. 5C.
Figure 5E:
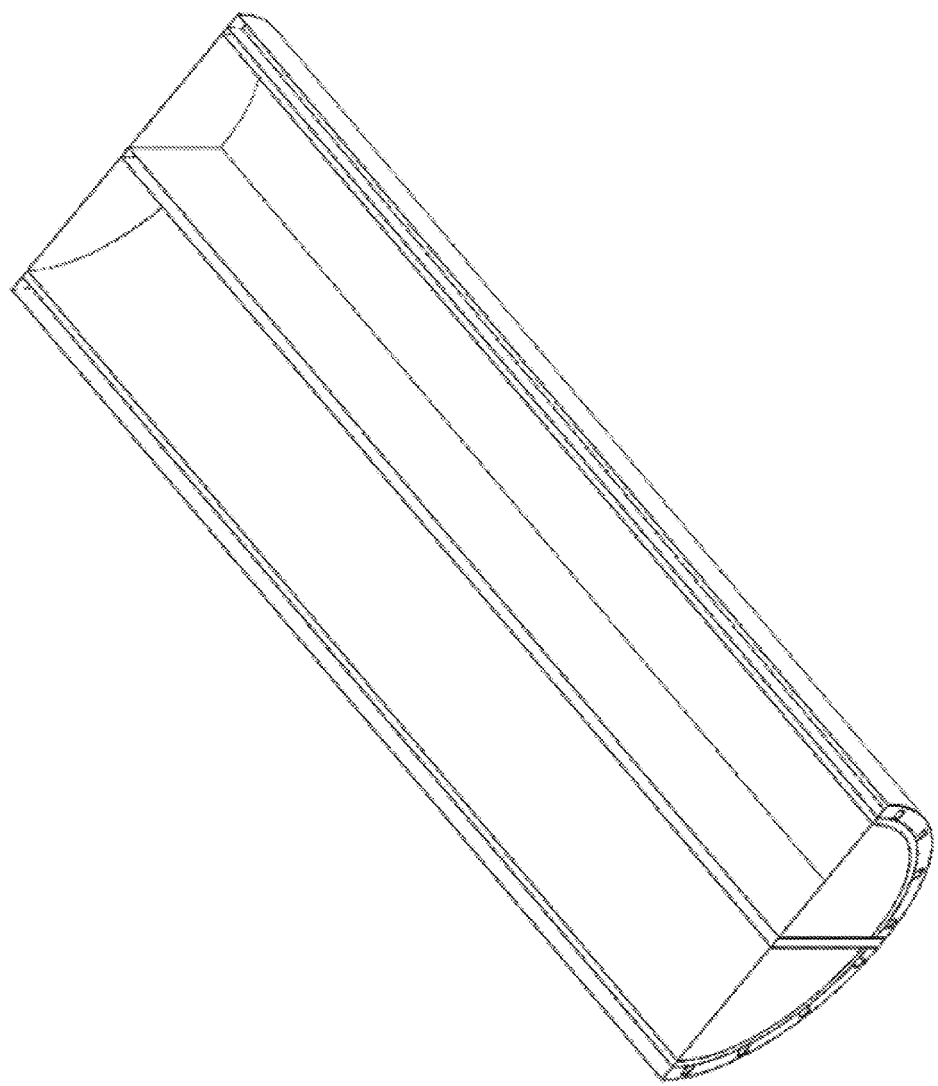
FIG. 5E is a perspective view of a cross-section of a portion of the exemplary reaction cell configuration illustrated in FIG. 5A in the XZ plane.
Figure 6A:
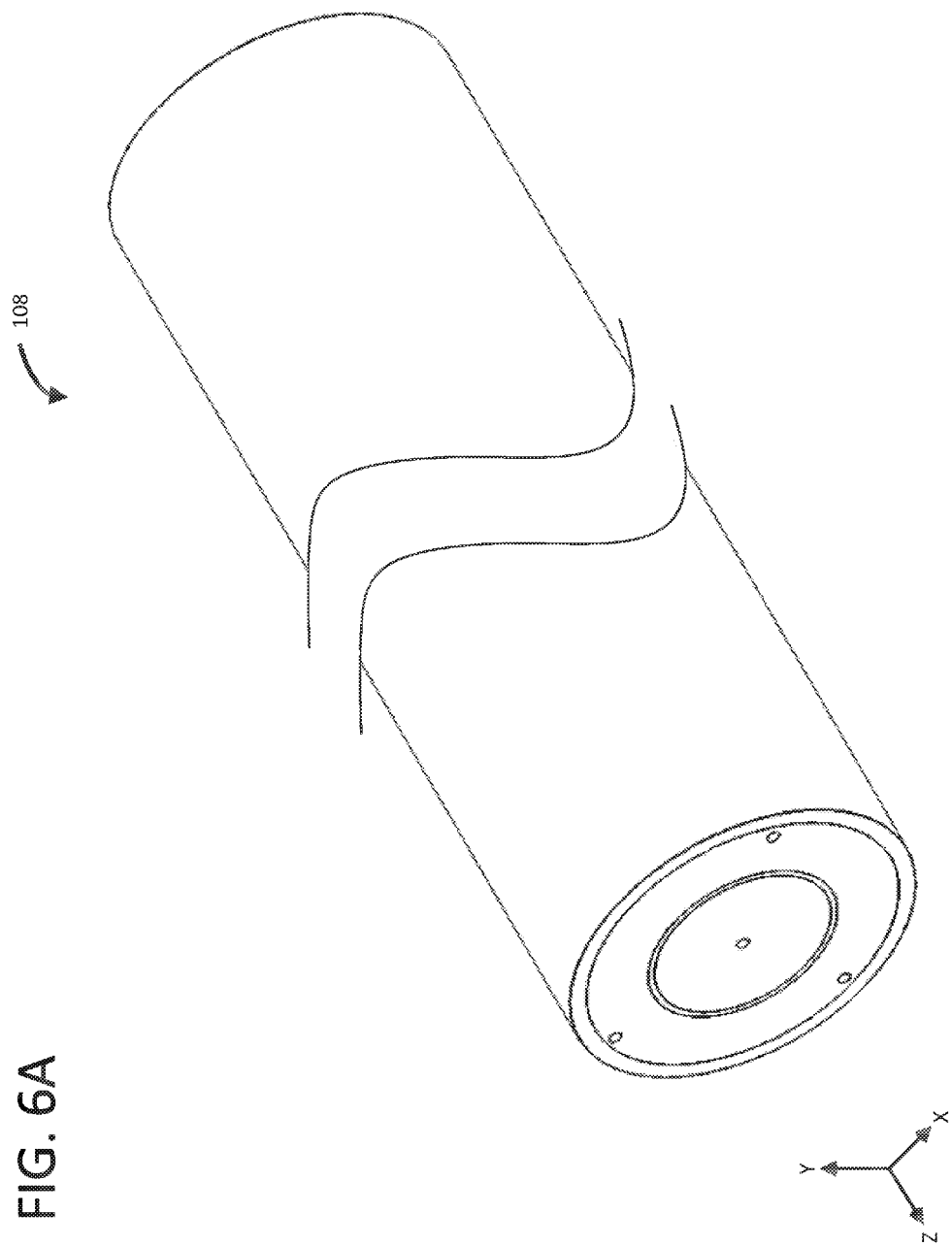
FIG. 6A is a perspective view of a portion of an exemplary reaction cell configuration according to another embodiment of the invention.
Figure 6B:
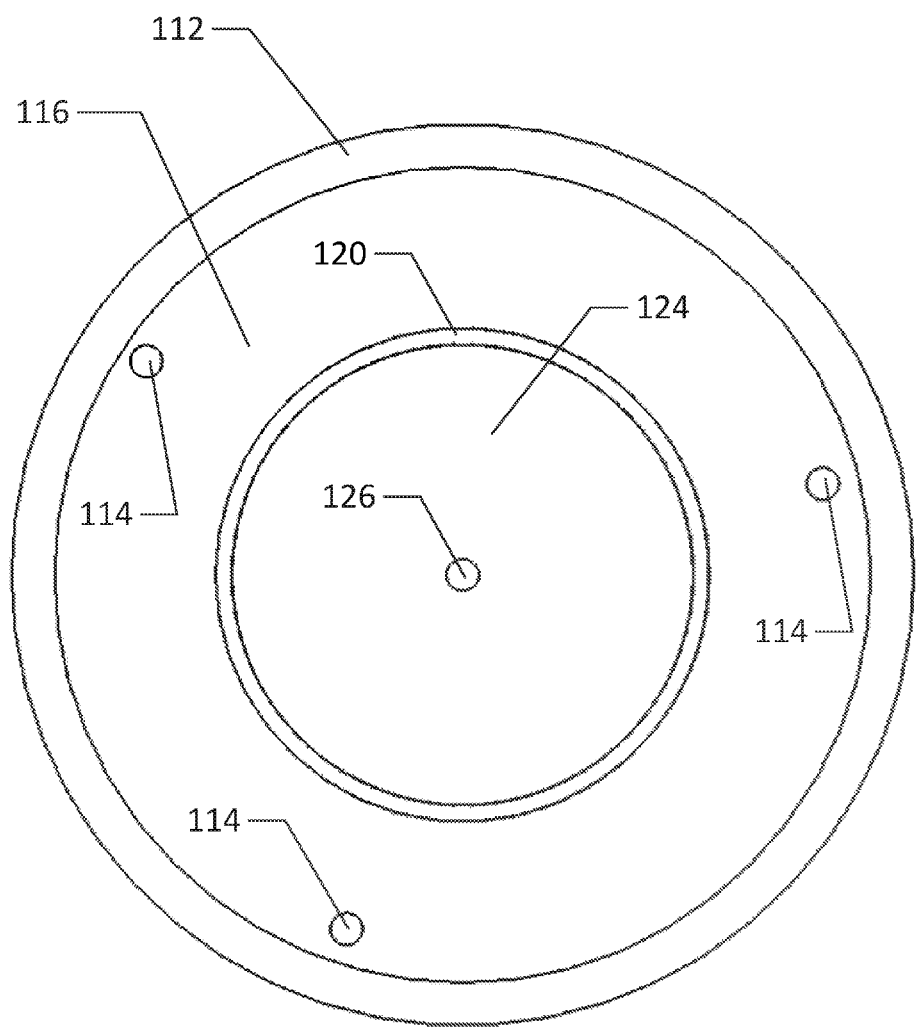
FIG. 6B is a cross-sectional view of the exemplary reaction cell configuration illustrated in FIG. 6A in the XY plane.
Figure 6C:
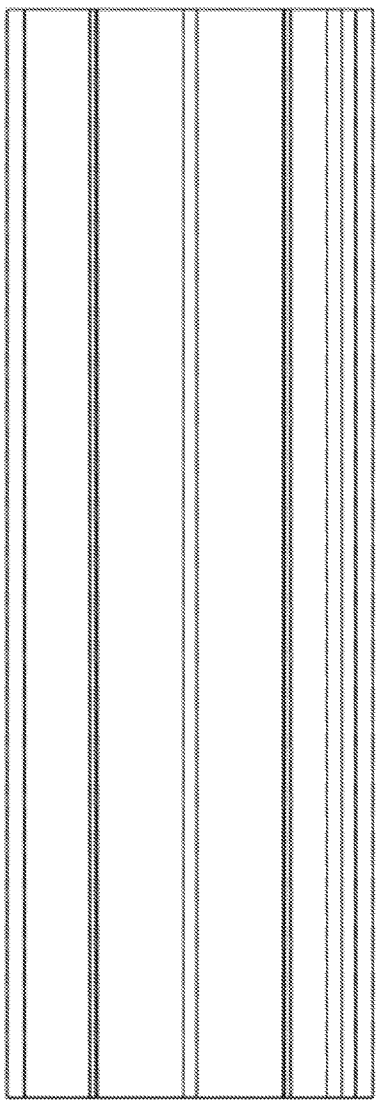
FIG. 6C is a cross-sectional view of a portion of the exemplary reaction cell configuration illustrated in FIG. 6A in the YZ plane.
Figure 6D:
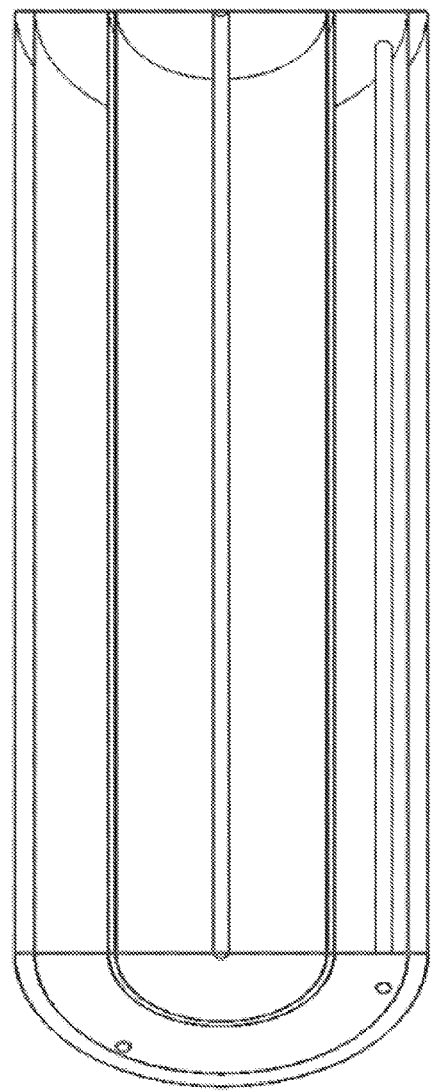
FIG. 6D is a perspective view of the cross-sectional view of FIG. 6C.
Figure 6E:
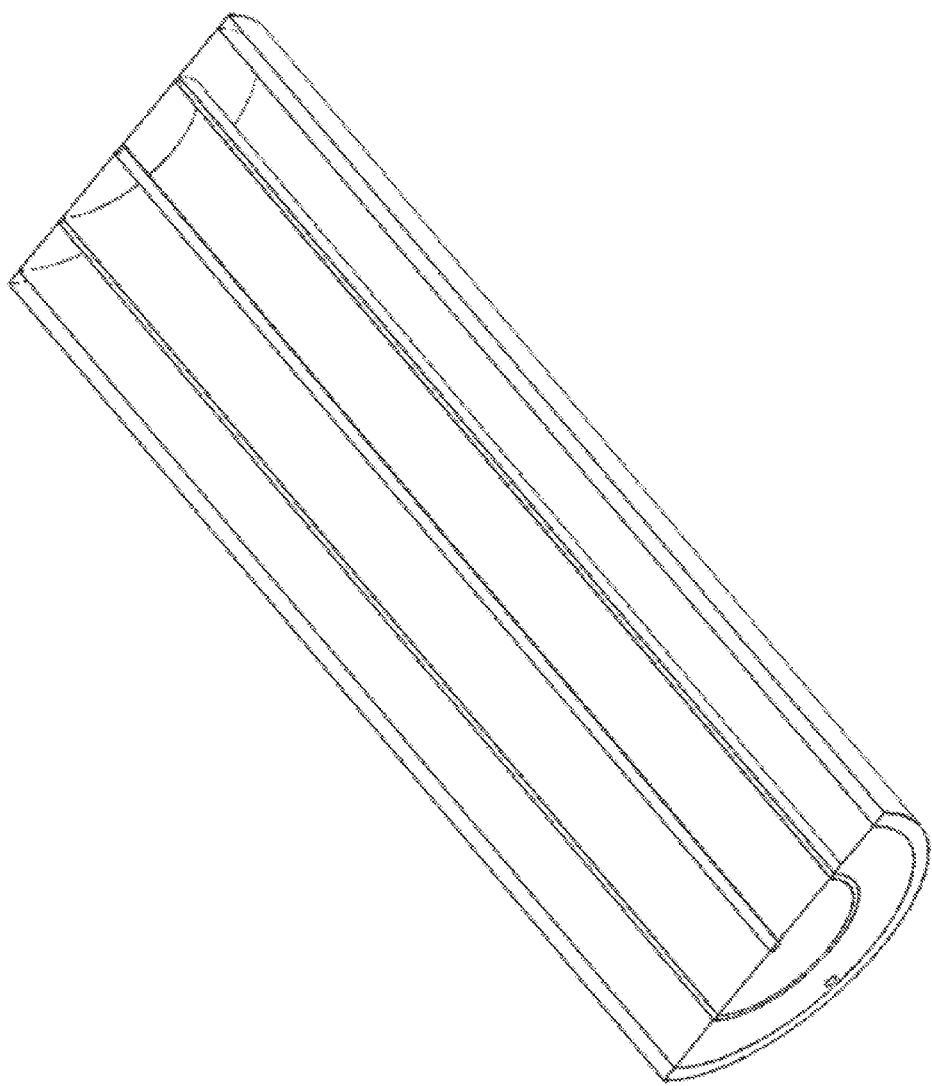
FIG. 6E is a perspective view of a cross-section of a portion of the exemplary reaction cell configuration illustrated in FIG. 6A in the XZ plane.
Figure 7A:
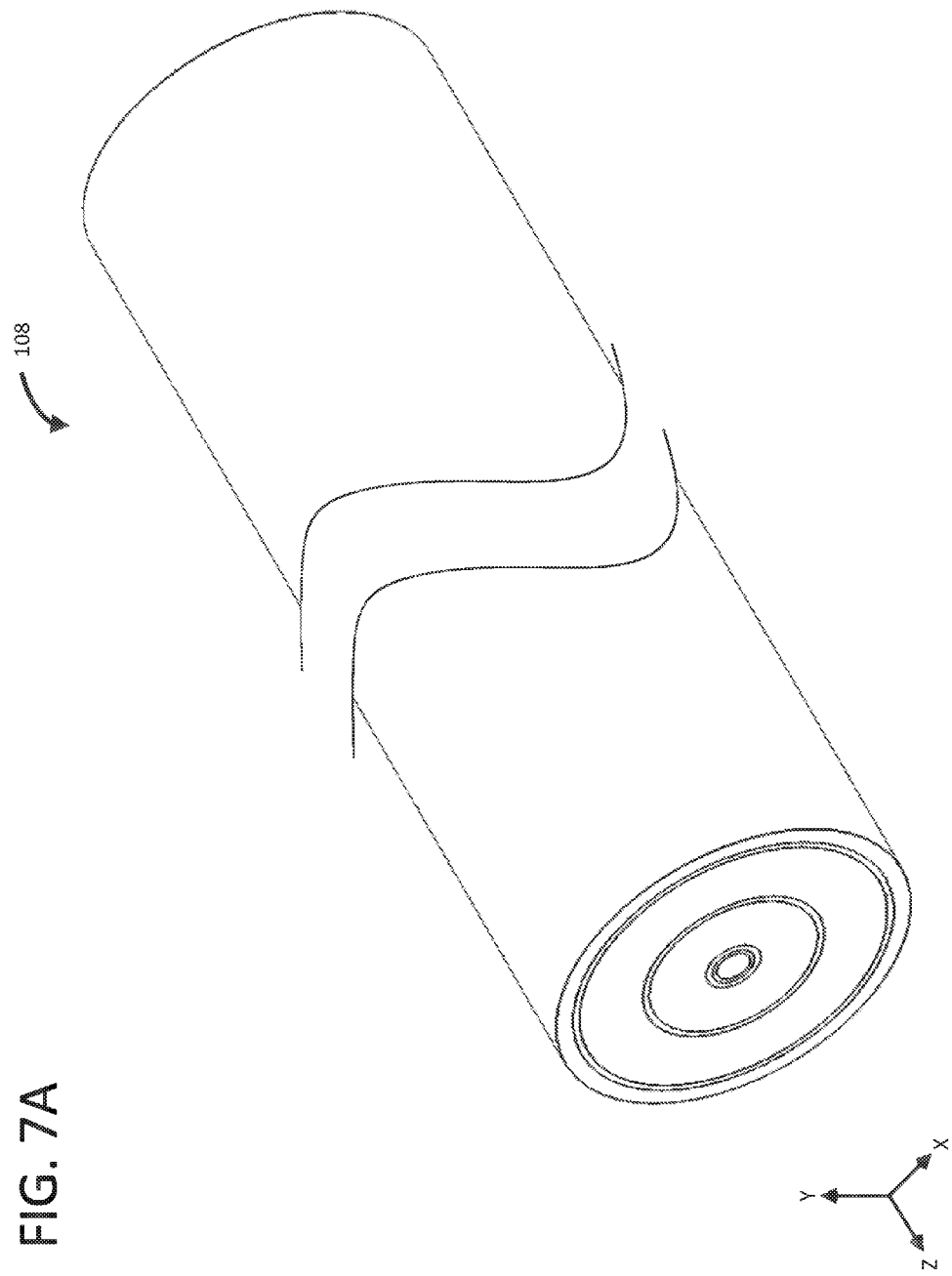
FIG. 7A is a perspective view of a portion of an exemplary reaction cell configuration according to another embodiment of the invention.
Figure 7C:
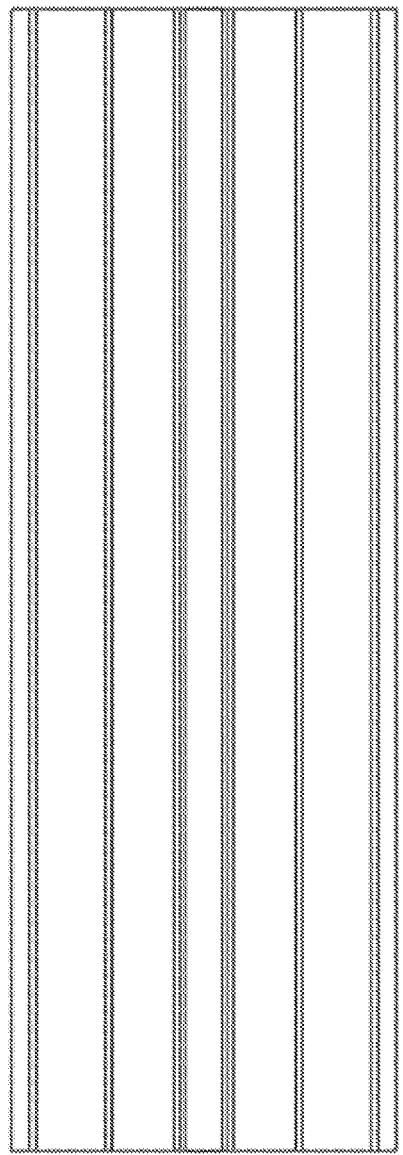
FIG. 7C is a cross-sectional view of a portion of the exemplary reaction cell configuration illustrated in FIG. 7A in the YZ plane.
Figure 7D:
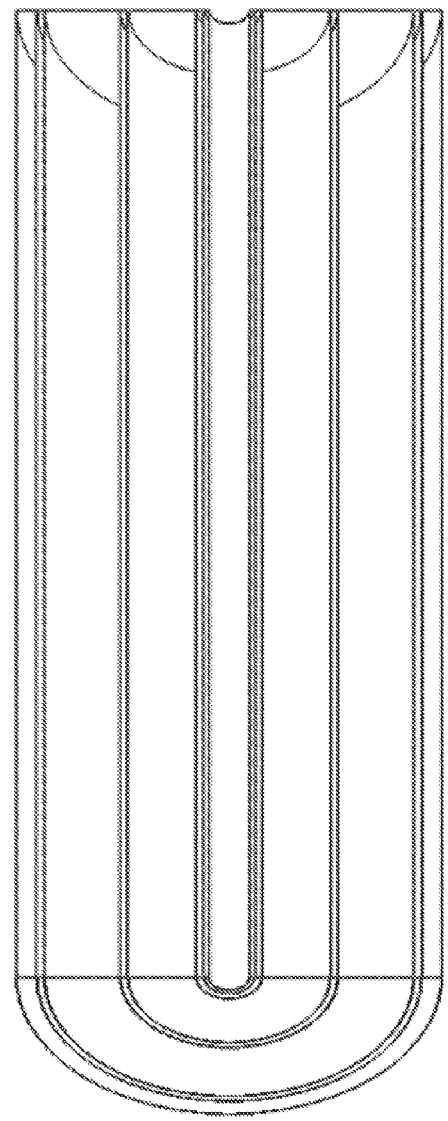
FIG. 7D is a perspective view of the cross-sectional view of FIG. 7C.
Figure 7E:
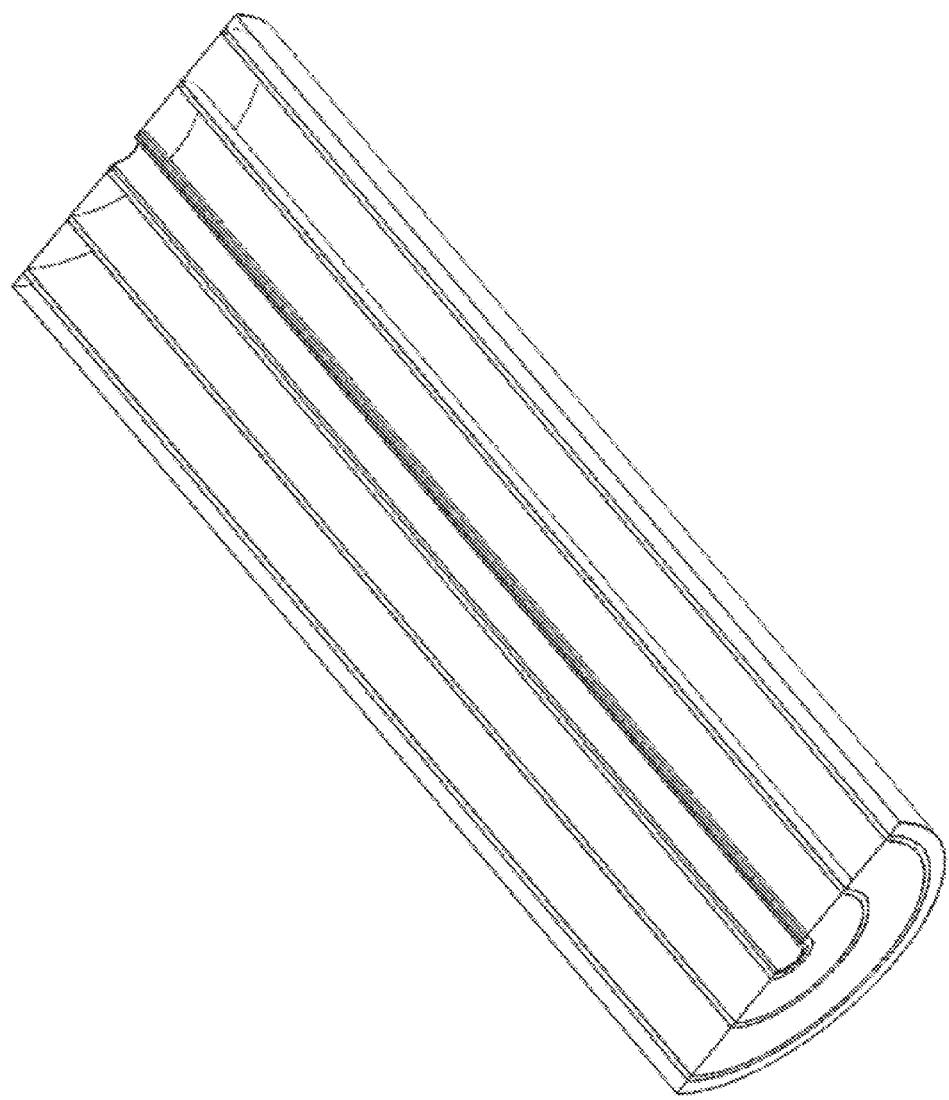
FIG. 7E is a perspective view of a cross-section of a portion of the exemplary reaction cell configuration illustrated in FIG. 7A in the XZ plane.
Figure 8A:
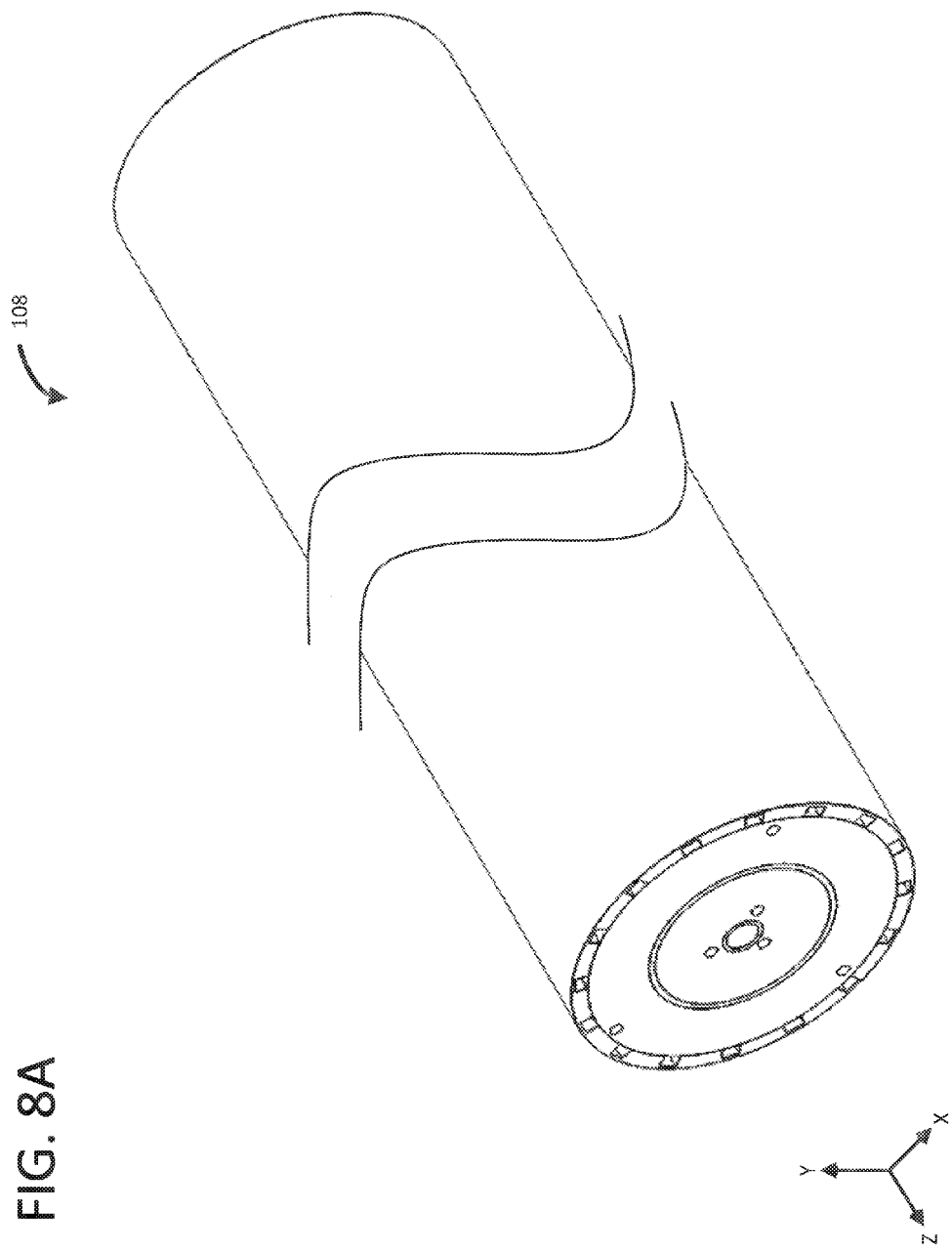
FIG. 8A is a perspective view of a portion of an exemplary reaction cell configuration according to another embodiment of the invention.
Figure 8B:
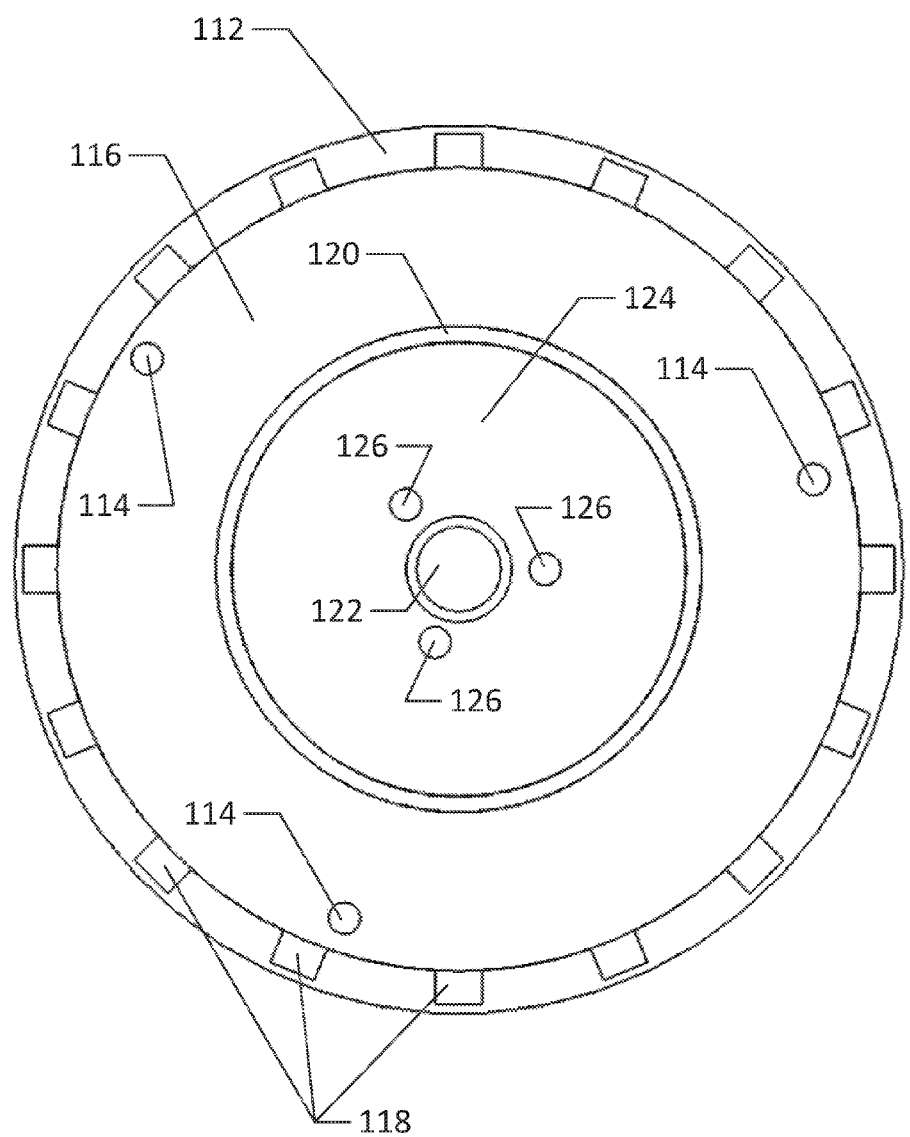
FIG. 8B is a cross-sectional view of the exemplary reaction cell configuration illustrated in FIG. 8A in the XY plane.
Figure 8C:
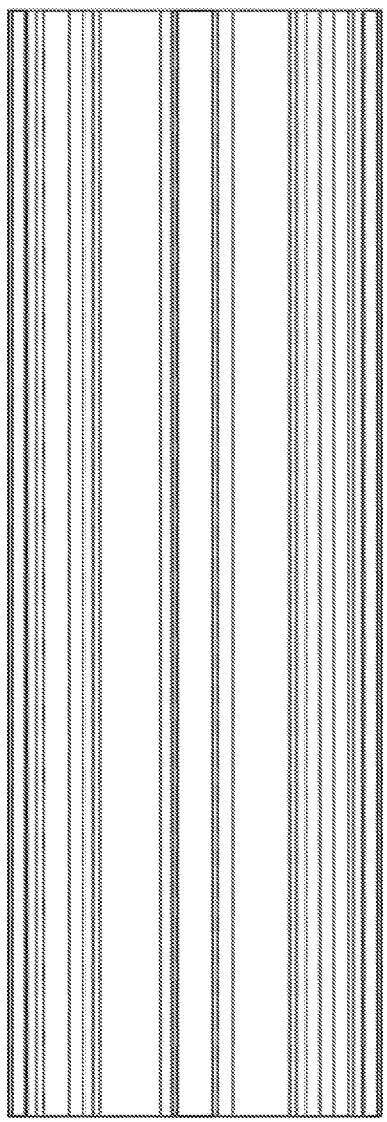
FIG. 8C is a cross-sectional view of a portion of the exemplary reaction cell configuration illustrated in FIG. 8A in the YZ plane.
Figure 8D:
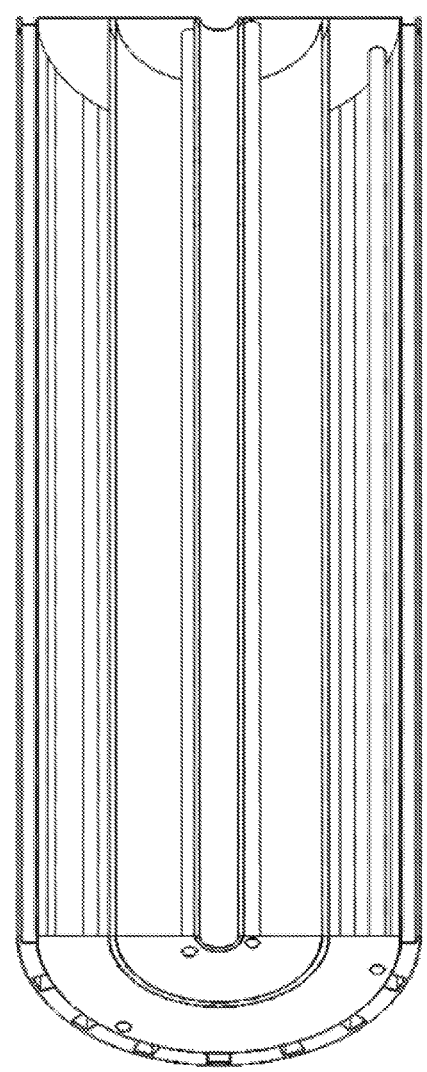
FIG. 8D is a perspective view of the cross-sectional view of FIG. 8C.
Figure 8E:
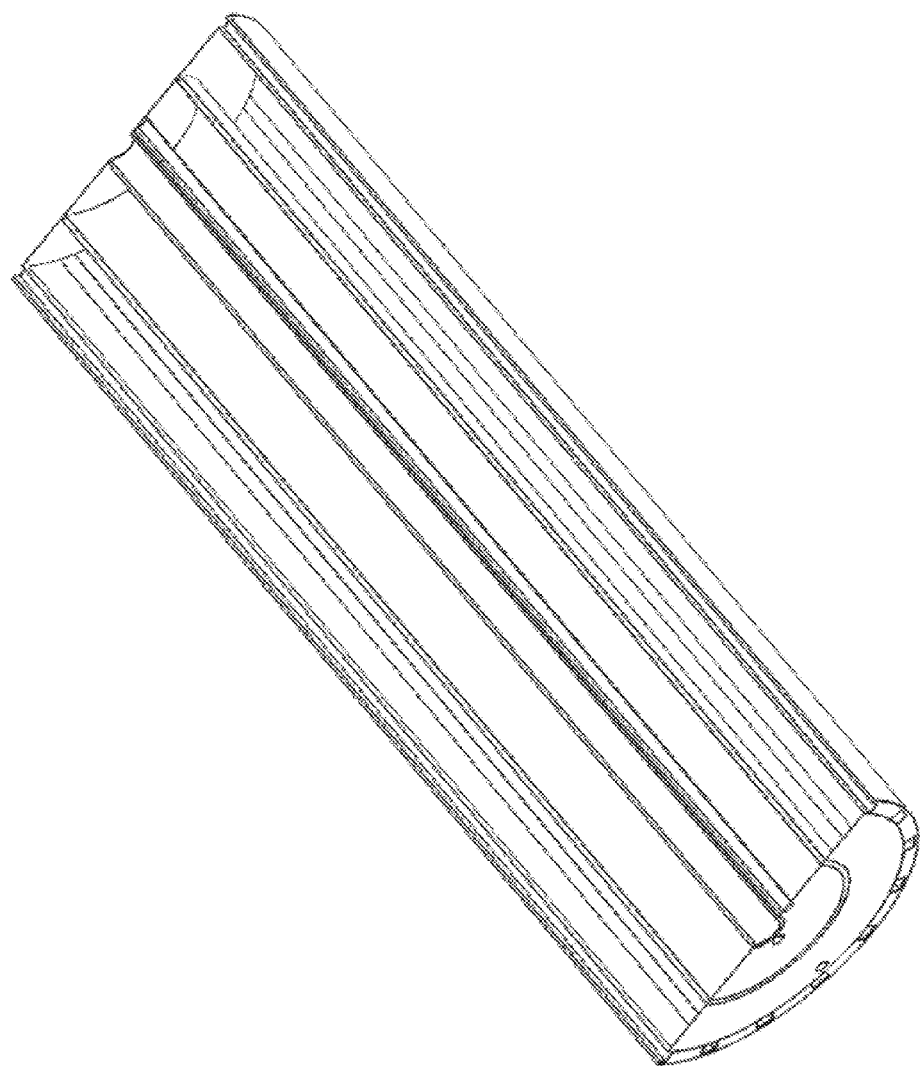
FIG. 8E is a perspective view of a cross-section of a portion of the exemplary reaction cell configuration illustrated in FIG. 8A in the XZ plane.
Figure 9A:
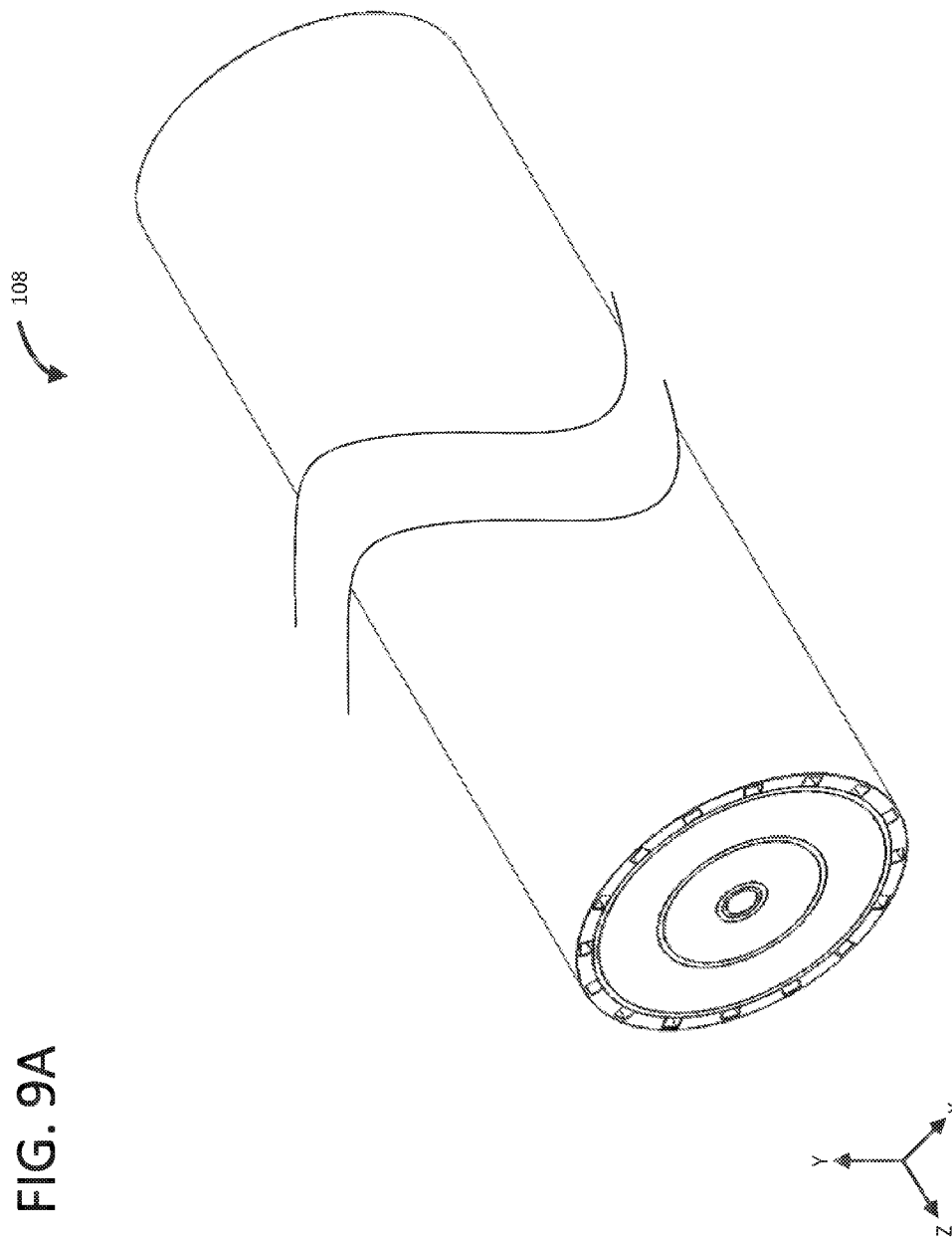
FIG. 9A is a perspective view of a portion of an exemplary reaction cell configuration according to another embodiment of the invention.
Figure 9B:
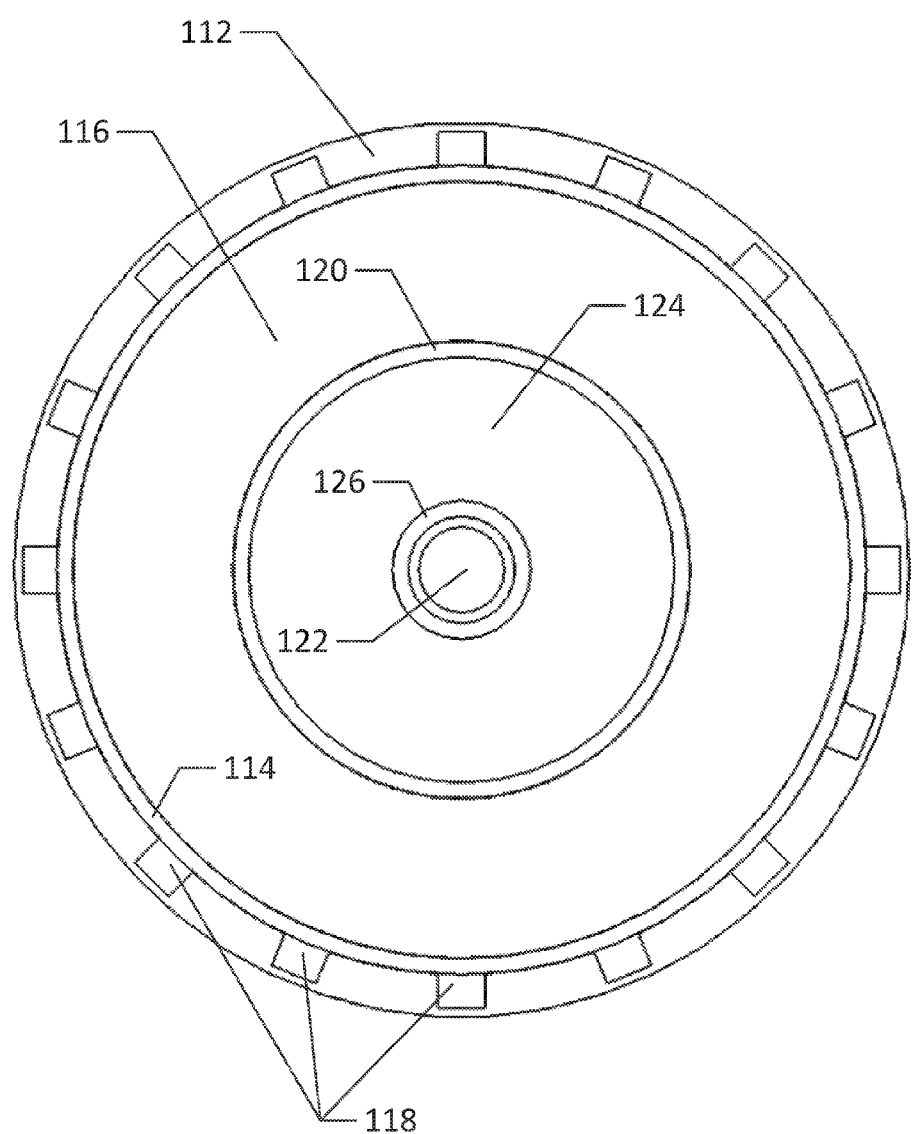
FIG. 9B is a cross-sectional view of the exemplary reaction cell configuration illustrated in FIG. 9A in the XY plane.
Figure 9E:
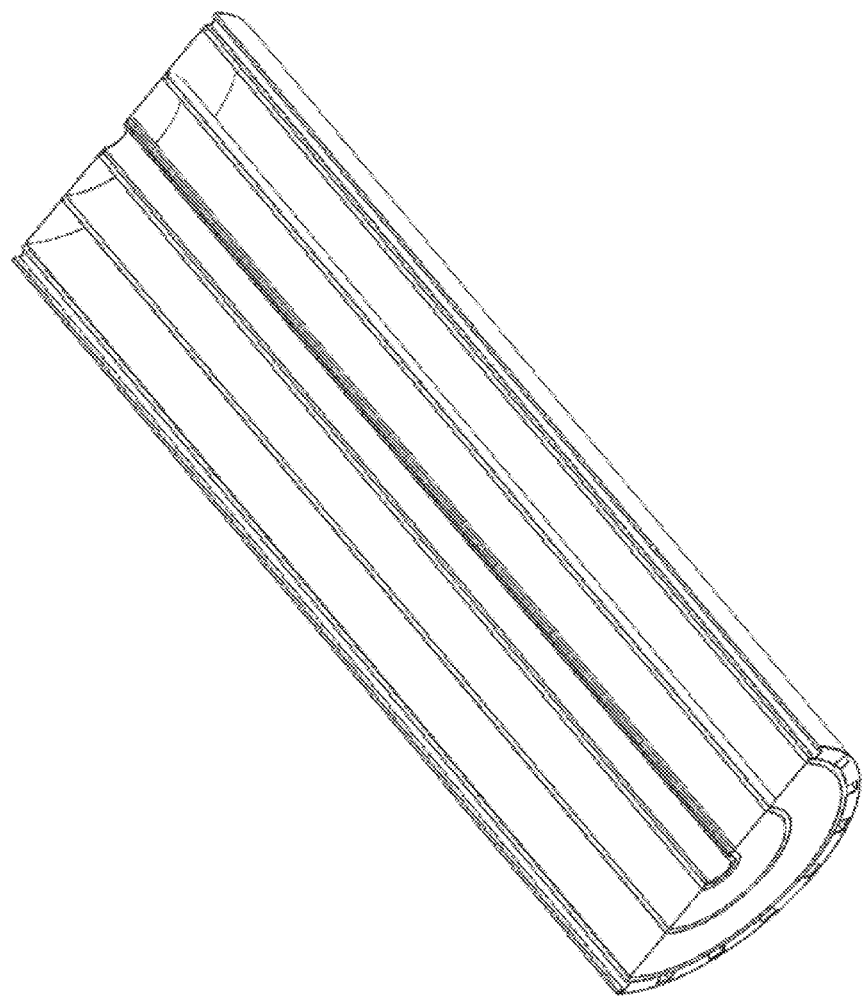
FIG. 9E is a perspective view of a cross-section of a portion of the exemplary reaction cell configuration illustrated in FIG. 9A in the XZ plane.

FIG. 1 illustrates an exemplary energy storage system 100 and an exemplary transport system 10 within which an embodiment of the energy storage system 100 may be incorporated. The energy storage system 100 includes tanks 102-A and 102-B, pumps 104-A and 104-B, input supply tubes 106-A and 106-B, a reaction flow cell 108, and output supply tubes 110-A and 110-B. The exemplary reaction flow cell 108 illustrated in FIG. 1 includes a sheath 112, a cathode current collector 114, a cathode electrode 116, optional cathode flow channels 118, a membrane 120, optional anode flow channels 122, an anode electrode 124, and an anode current collector 126. In an embodiment, energy storage system 100 comprises a vanadium redox battery (i.e., vanadium flow battery).

The input supply tube 106-A couples the tank 102-A to the pump 104-A and pump 104-A to reaction flow cell 108. The input supply tube 106-B couples the tank 102-B to the pump 104-B and pump 104-B to reaction flow cell 108. The output supply tubes 110-A, 110-B couple reaction flow cell 108 to tanks 104-A and 104-B, respectively. In an embodiment, tanks 102-A, 102-B, pumps 104-A, 104-B, input supply tubes 106-A, 106-B, reaction flow cell 108, and/or output supply tubes 110-A, 110-B are mechanically coupled to portions of transport system 10. For example, mechanical fasteners (e.g., brackets, braces, etc.) may couple the components of energy storage system 100 to structural elements (e.g., undercarriage, frame, etc.) of transport system 10.

Although the transport system 10 illustrated in FIG. 1 is an automobile, one having ordinary skill in the art will understand that aspects of energy storage system 100 may be incorporated within other types of transport systems. Additional transport systems within which energy storage system 100 may be incorporated include, but are not limited to, motor vehicles (e.g., automobiles, motorcycles, scooters, trucks, buses, etc.), railed vehicles (e.g., trains, trams, etc.), watercraft (e.g., ships, boats, etc.), aircraft (e.g., airplanes, unmanned aerial vehicles, etc.), spacecraft, self-propelled robots, and the like. The energy storage system 100 may be particularly useful in electric vehicles and other types of transport systems that require a clean power source.

The tanks 102-A, 102-B are each configured for storing electrolytes. In an embodiment, tank 102-A is configured for storing an anolyte and tank 102-B is configured for storing a catholyte. The tanks 102-A, 102-B may be comprised of a metal and/or polymer compatible with the stored electrolytes. An exemplary material from which tanks 102-A, 102-B may be manufactured includes polyvinyl chloride (PVC), polytetrafluoroethylene (PTFE), high-density polyethylene (HDPE), low-density polyethylene (LDPE), and the like. The size (e.g., volume capacity) and shape of tanks 102-A, 102-B may be altered depending upon the environment in transport system 10 in which they will be installed. The size of tanks 102-A, 102-B can also be modified to satisfy energy storage requirements of the specific application. In other words, the energy capacity and power capacity of energy storage system 100 are independent of each other. In an embodiment, tanks 102-A, 102-B each include an opening configured to allow emptying and re-filling of the tanks with electrolytes. For instance, the openings may allow the tanks 102-A, 102-B to undergo a refueling operation similar to adding gasoline to a conventional internal combustion vehicle. An exemplary anolyte for use with energy storage system 100 includes vanadium electrolyte solution ($V^{+2}$, $V^{+3}$) and an exemplary catholyte includes vanadium electrolyte solution ($V^{+5}$, $V^{+4}$).

The pumps 104-A, 104-B are each configured for pumping electrolytes (e.g., anolyte, catholyte, etc.) from tanks 102-A, 102-B through input supply tubes 106-A, 106-B, respectively, to reaction flow cell 108. Exemplary pumps include SMART Digital DDA 7.5-16AR-PVC/V/C model pumps manufactured by Grundfos, Bjerringbro, Germany.

The input supply tubes 106-A, 106-B are each configured for fluidly communicating electrolytes from tanks 102-A, 102-B, respectively, to reaction flow cell 108. The output supply tubes 110-A, 110-B are each configured for fluidly communicating electrolytes from reaction flow cell 108 to tanks 102-A, 102-B, respectively. The input supply tubes 106-A, 106-B and output supply tubes 110-A, 110-B may be comprised of any polymer compatible with the electrolytes, such as PVC, PTFE, HDPE, LDPE, and the like.

The reaction flow cell 108 is configured to provide an environment through which the electrolytes flow, resulting in ion exchange that provides a flow of electric current. The reaction flow cell 108 may be comprised of various cross-sectional configurations, as further described herein. Although the cross-sections of reaction flow cell 108 described herein are substantially circular, one having ordinary skill in the art will understand that reaction flow cell 108 may have different cross-sectional shapes, such as rectangular, square, elliptical, triangular, hexagonal, octagonal, U-shaped, and the like. The reaction flow cell 108 is distributed throughout transport system 10. For example, reaction flow cell 108 may be distributed in a serpentine configuration in an area defined by the length and width of transport system 10, as shown in FIG. 1. In an embodiment, the serpentine configuration may also be referred to as looped and/or wound. Although the serpentine configuration illustrated in FIG. 1 includes loops in a direction transverse to transport system 10, one having ordinary skill in the art will understand that the loops may be in other directions, such as longitudinally relative to transport system 10 and the like. The reaction flow cell 108 may also be wound like a coil and/or distributed throughout transport system 10 in three dimensions. In an embodiment, distribution of reaction flow cell 108 throughout transport system 10 is configured to efficiently utilize available space in transport system 10, distribute the weight of reaction flow cell 108, and/or increase (e.g., maximize) the length of the membrane 120 relative to the volume of reaction flow cell 108 (e.g., to increase electrical power capacity). In another embodiment, reaction flow cell 108 is configured to permit charging of energy storage system 100. One having ordinary skill in the art will understand that the various configurations of reaction flow cell 108 described herein may be interchanged without departing from the scope of the present invention.

The sheath 112 is configured to contain and protect the cathode current collector 114, the cathode electrode 116, the optional cathode flow channels 118, the membrane 120, the optional anode flow channels 122, the anode electrode 124, and the anode current collector 126. The sheath 112 may be manufactured from any polymer compatible with the electrolytes, such as PVC, PTFE, HDPE, and LDPE. In the embodiment illustrated in FIG. 1, sheath 112 is a tubular structure that has a substantially circular cross-section and is hollow. As described above, sheath 112 may have a cross-section of various other shapes. The sheath 112 is flexible, which at least in part allows reaction flow cell 108 to be distributed throughout transport system 10 in various configurations (e.g., serpentine, etc.).

The cathode current collector 114 and anode current collector 126 are configured to carry electrical current from the cathode electrode 116 and the anode electrode 124, respectively, to electrical contacts connected to an electrical load of transport system 10. In an embodiment, cathode current collector 114 and anode current collector 126 are comprised of graphite. The cathode current collector 114 may comprise one or more wires extending throughout the length of reaction flow cell 108 or may be a layer of graphite between sheath 112 and cathode electrode 116. The anode current collector 126 may also comprise one or more wires extending throughout the length of reaction flow cell 108, may be a layer of graphite between sheath 112 and anode electrode 124, or may be a layer of graphite inside anode electrode 124. FIGS. 2A-D, 4A-E, 6A-E, and 8A-E illustrate exemplary configurations of reaction flow cell 108 having wire cathode current collectors 114 and anode current collectors 126. For purposes of better illustrating the wire cathode current collectors 114 and anode current collectors 126, the exemplary configurations of reaction flow cell 108 in FIGS. 2C-D, 4C-E, 6C-E, and 8C-E omit the cathode electrode 116 and the anode electrode 124. FIGS. 3A-D, 5A-E, 7A-E, and 9A-E illustrate exemplary configurations of reaction flow cell 108 having cathode current collectors 114 and anode current collectors 126 in a layer configuration. For purposes of better illustrating the layer cathode current collectors 114 and anode current collectors 126, the exemplary configurations of reaction flow cell 108 in FIGS. 3C-D, 5C-E, 7C-E, and 9C-E omit the cathode electrode 116 and the anode electrode 124.

Referring again to FIG. 1, the cathode electrode 116 is configured to fluidly communicate catholyte through reaction flow cell 108. In an embodiment, cathode electrode 116 is a porous carbon set. The cathode electrode 116 may have a substantially half-circular cross-section (e.g., half-cell) or a substantially circular cross-section that is coaxial with sheath 112 and anode electrode 124, as further described herein. The anode electrode 124 is configured to fluidly communicate anolyte through reaction flow cell 108. In an embodiment, anode electrode 124 is a porous carbon set. The anode electrode 124 may have a substantially half-circular cross-section or a substantially circular cross-section that is coaxial with sheath 112 and cathode electrode 116, as further described herein. FIGS. 2A-D, 3A-D, 4A-E, and 5A-E illustrate exemplary configurations of reaction flow cell 108 having a substantially circular cross-section in which cathode electrode 116 and anode electrode 124 are each substantially half-circular. FIGS. 6A-E, 7A-E, 8A-E, and 9A-E illustrate exemplary configurations of reaction flow cell 108 having a substantially circular cross-section in which cathode electrode 116 and anode electrode 124 each have substantially circular cross-sections and are coaxial.

With renewed reference to FIG. 1, the membrane 120 is configured to provide an interface between cathode electrode 116 and anode electrode 124 (e.g., between catholyte and anolyte). In an embodiment, membrane 120 is configured to prevent electron transfer and allow ion transfer between cathode electrode 116 and anode electrode 124 to maintain charge equilibrium. For example, membrane 120 may be comprised of a polymer, such as Nafion 117, Nafion 115, Nafion 211, and the like. As further described herein, membrane 120 may bisect a substantially circular cross section of reaction flow cell 108. The membrane 120 may also have a substantially circular cross-section that is coaxial with sheath 112, cathode electrode 116, and anode electrode 124.

In an embodiment, reaction flow cell 108 may include one or more cathode flow channels 118 and/or one or more anode flow channels 122. The optional cathode flow channels 118 are configured to improve the flow of catholyte through cathode electrode 116 and the optional anode flow channels 122 are configured to improve the flow of anolyte through anode electrode 124. As illustrated in FIG. 1, cathode flow channels 118 may have a substantially rectangular cross-section and anode flow channels 122 may have a substantially circular cross-section. But one having ordinary skill in the art will understand that cathode flow channels 118 and anode flow channels 122 may each have cross-sections of various shapes including, but not limited to, substantially triangular, substantially hexagonal, substantially octagonal, and the like. FIGS. 2A-D, 3A-D, 6A-E, and 7A-E illustrate exemplary configurations of reaction flow cell 108 without cathode flow channels 118 or anode flow channels 122. FIGS. 4A-E, 5A-E, 8A-E, and 9A-E illustrate exemplary configurations of reaction flow cell 108 with cathode flow channels 118 and at least one anode flow channel 122.

In an exemplary operation of energy storage system 100, pump 104-A pumps anolyte from tank 102-A through anode electrode 124 and pump 104-B pumps catholyte from tank 104-B through cathode electrode 116. Optionally, pump 104-A also pumps anolyte through anode flow channels 122 and/or pump 104-B also pumps catholyte through cathode channels 118. During discharge of energy storage system 100, electrons are released from anode electrode 124 (e.g., negative) and ions pass through membrane 120. For example, the electrons may be released via an oxidation reaction. The released electrons pass through anode current collector 126 and through an electrical load of transport system 10 such that the movement of electrons creates an electrical current. The cathode electrode 116 (e.g., positive) accepts electrons, such as via a reduction reaction for example. As understood by one having ordinary skill in the art, the potential difference between anode electrode 124 and cathode electrode 116 determines the voltage (e.g., electromotive force) generated by energy storage system 100. And because the product of voltage and current is electric power (e.g., P=V*I), energy storage system 100 delivers electrical energy to the electrical load of transport system 10.

EXAMPLE

An experimental energy storage system included tanks, pumps, input supply tubes, a reaction cell, and output supply tubes, as described herein. The pumps were model number SMART Digital DDA 7.5-16AR-PVC/V/C manufactured by Grundfos, Bjerringbro, Germany. The supply tubes were comprised of PVC, PTFE, HDPE, and LDPE. The reaction cell was 10 centimeters in length and comprised of a PVC, PTFE, HDPE, and LDPE sheath, a graphite cathode current collector, a graphite felt cathode electrode, a Nafion 117 membrane, a graphite felt anode electrode, and a graphite rod or platinum wire anode current collector. The reaction cell in this experiment did not include flow channels.

Figure 10A:
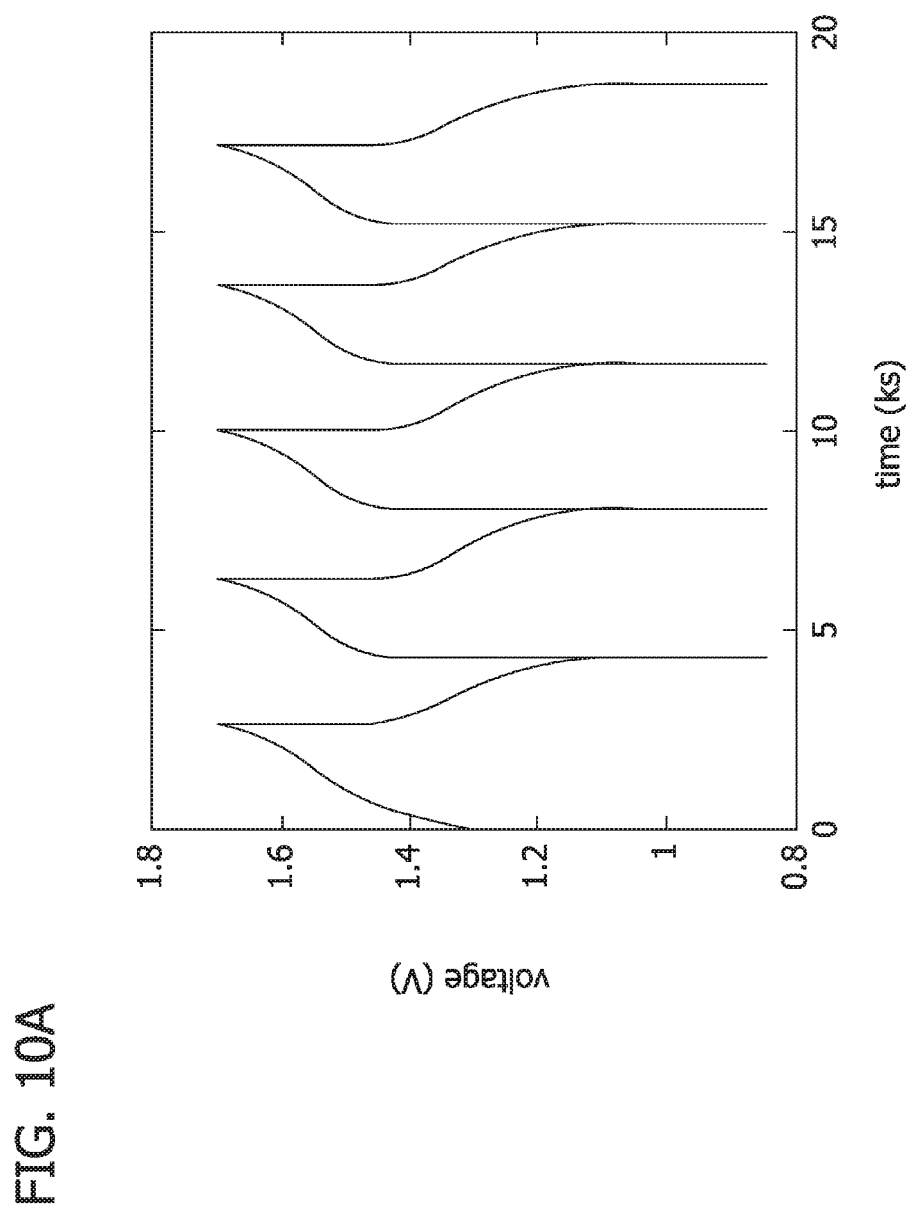
FIG. 10A is a voltage waveform produced by an exemplary energy storage system according to an embodiment of the invention.

FIG. 10A illustrates a voltage waveform representing a direct current voltage produced by the experimental energy storage system over a time of about 19 seconds. The voltage peaks of the illustrated waveform represent the end of charging cycles and the voltage troughs represent the end of discharging cycles. As shown, each charge-discharge cycle completes over a time period of about four seconds and the maximum voltage potential is about 1.7 volts.

Figure 10B:
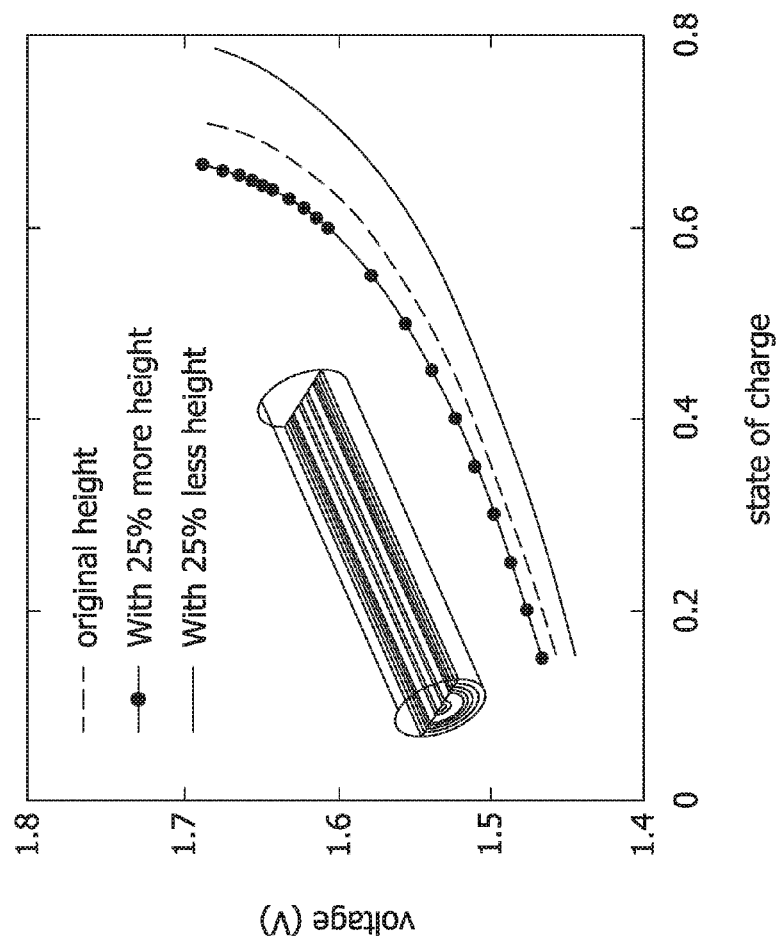
FIG. 10B is a profile indicating a calculated voltage from a conventional energy storage system relative to a charge state of the system.

FIG. 10B illustrates a profile indicating a calculated voltage from a conventional energy storage system relative to a charge state of the conventional system. As illustrated, increasing chemical height by 25% results in the same maximum voltage of about 1.7 volts with a slightly less state of charge as compared to the original height (e.g., 0.65 vs. 0.7). Also shown, decreasing height by 25% requires a state of charge of about 0.8 in order to prove the maximum voltage of about 1.7 volts. The results from the conventional cell indicate that adding channels into the distributed reaction cell may improve performance.

Figure 10C:
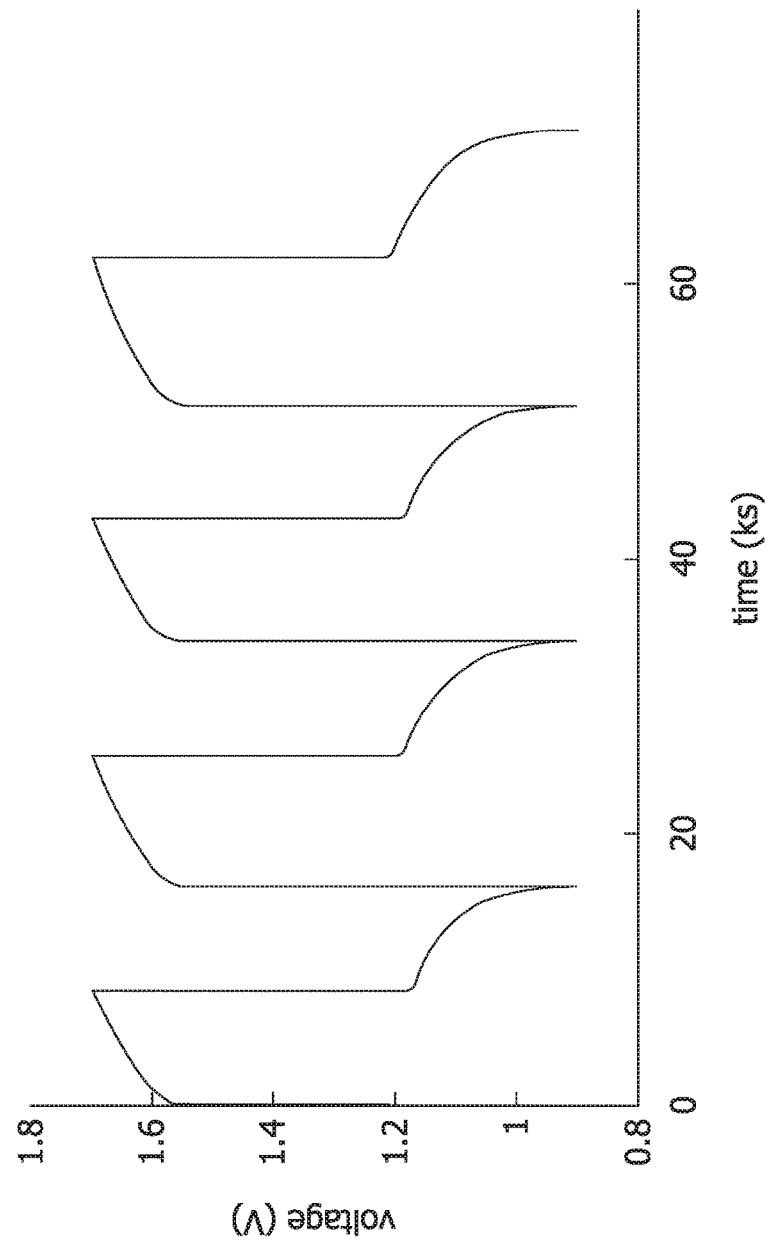
FIG. 10C is another voltage waveform produced by an exemplary energy storage system according to an embodiment of the invention.

FIG. 10C is another voltage waveform produced by an exemplary energy storage system according to an embodiment of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a", "an", "the" and "said" are intended to mean that there are one or more of the elements. The terms "comprising", "including", and "having" are intended to be inclusive and mean that there may be additional elements other than the listed elements.

In view of the above, it will be seen that the several objects of the invention are achieved and other advantageous results attained.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. An energy storage system, comprising:
   a first tank configured for storing an anolyte;
   a second tank configured for storing a catholyte;
   a reaction cell configured for distribution throughout a transport system and for supplying electrical current to an electrical load of the transport system, said reaction cell being elongate and comprising an anode electrode in fluid communication with the first tank and a cathode electrode in fluid communication with the second tank, said reaction cell further comprising a membrane configured to form an interface between the anode electrode and cathode electrode;

a first pump configured for pumping the anolyte from the first tank through the anode electrode of the reaction cell via a first input supply tube; and a second pump configured for pumping the catholyte from the second tank through the cathode electrode of the reaction cell via a second input supply tube; and wherein a length of the reaction cell is substantially greater than a width thereof and the length of the reaction cell is greater than at least one of a width and a length of the transport system, and wherein the membrane has a length substantially equal to the length of the reaction cell such that surface area of the membrane is maximized relative to volume of the reaction cell.

2. The energy storage system of claim 1, wherein the reaction cell is configured for distribution throughout the transport system in a serpentine configuration within an area defined by the width and the length of the transport system.

3. The energy storage system of claim 1, further comprising an anode current collector coupled to the anode electrode and a cathode current collector coupled to the cathode electrode, wherein the anode current collector and the cathode current collector are configured for providing the electrical current generated in the reaction cell to the electrical load of the transport system.

4. The energy storage system of claim 3, wherein the reaction cell has a substantially circular cross-section and wherein the membrane bisects the cross-section such that the anode electrode and the cathode electrode each comprise a substantially half-circle portion of the cross-section.

5. The energy storage system of claim 3, wherein the anode current collector comprises at least one wire extending longitudinally relative to the reaction cell, and wherein the cathode current collector comprises at least one wire extending longitudinally relative to the reaction cell.

6. The energy storage system of claim 3, wherein the reaction cell comprises an exterior flexible polymer sheath and wherein the anode current collector comprises a first conductive layer between an outer surface of the anode electrode and an inner surface of a first portion of the flexible polymer sheath, and wherein the cathode current collector comprises a second conductive layer between an outer surface of the cathode electrode and an inner surface of a second portion of the flexible polymer sheath, the first and second conductive layers extending longitudinally relative to the reaction cell.

7. The energy storage system of claim 6, wherein the first portion of the flexible polymer sheath includes a plurality of anode flow channels therethrough adjacent to the first conductive layer and extending longitudinally relative to the reaction cell, the anode flow channels configured to improve a flow of anolyte through the anode electrode, and wherein the second portion of the flexible polymer sheath includes a plurality of cathode flow channels therethrough adjacent to the second conductive layer and extending longitudinally relative to the reaction cell, the cathode flow channels configured to improve a flow of catholyte through the cathode electrode.

8. The energy storage system of claim 1, wherein the reaction cell is tubular and has an exterior flexible polymer sheath, wherein the membrane is tubular and has a radius less than a radius of the sheath, and wherein the cathode electrode and the anode electrode are coaxial relative to each other within the sheath and have the membrane therebetween.

9. The energy storage system of claim 8, wherein the reaction cell comprises one or more flow channels extending longitudinally therethrough configured to improve a flow of at least one of the catholyte through the cathode electrode and the anolyte through the anode electrode.

10. The energy storage system of claim 8, wherein the reaction cell comprises a tubular anode current collector within the sheath and coupled anode electrode and a tubular cathode current collector within the sheath and coupled to the cathode electrode, the anode current collector and the cathode current collector extending longitudinally relative to the reaction cell and configured for providing electrical current generated in the reaction cell to an electrical load of the transport system.

11. The energy storage system of claim 1, wherein the reaction cell is tubular.

12. The energy storage system of claim 1, wherein the reaction cell comprises a flexible polymer sheath having a plurality of anode flow channels therethrough adjacent to the anode electrode and extending longitudinally relative to the reaction cell and having a plurality of cathode flow channels therethrough adjacent to the cathode electrode and extending longitudinally relative to the reaction cell, wherein the anode flow channels are configured to improve a flow of anolyte through the anode electrode and the cathode flow channels are configured to improve a flow of catholyte through the cathode electrode.

13. The energy storage system of claim 1, wherein a volumetric capacity of a first portion of the reaction cell is independent of a volumetric capacity of the first tank, and wherein a volumetric capacity of a second portion of the reaction cell is independent of a volumetric capacity of the second tank.

14. The energy storage system of claim 13, wherein a volume of the anolyte within the first portion of the reaction cell is independent of a volume of the anolyte stored in the first tank, and wherein a volume of the catholyte within the second portion of the reaction cell is independent of a volume of the catholyte stored in the second tank.

15. The energy storage system of claim 13, wherein a combined cell volumetric capacity of the first portion and the second portion is greater than a combined tank volumetric capacity of the first tank and the second tank.

16. The energy storage system of claim 15, wherein a combined cell volume of the anolyte within the first portion and the catholyte within the second portion is greater than a combined tank volume of the anolyte stored in the first tank and the catholyte stored in the second tank.

17. An energy storage system for use with an electric vehicle, comprising:
a first tank configured for storing an anolyte;
a second tank configured for storing a catholyte;
a reaction cell configured for use in an electric vehicle, said reaction cell being elongate and comprising an anode electrode in fluid communication with the first tank and a cathode electrode in fluid communication with the second tank, said reaction cell further comprising a membrane configured to form an interface between the anode electrode and cathode electrode;
a first pump configured for pumping the anolyte from the first tank through the anode electrode of the reaction cell via a first input supply tube; and a second pump configured for pumping the catholyte from the second tank through the cathode electrode of the reaction cell via a second input supply tube; and wherein a length of the reaction cell is substantially greater than a width thereof and the length of the reaction cell is greater than at least one of a width and a length of the electric vehicle, wherein the reaction cell is distributed throughout the electric vehicle in a serpentine configuration within an area defined by the width and the length of the electric vehicle, and wherein the membrane has a length substantially equal to the length of the reaction cell such that surface area of the membrane is maximized relative to volume of the reaction cell.

18. The energy storage system of claim 17, further comprising an anode current collector coupled to the anode electrode and a cathode current collector coupled to the cathode electrode, wherein the anode current collector and the cathode current collector are configured for providing electrical current generated in the reaction cell to an electrical load of the electric vehicle.

19. The energy storage system of claim 18, wherein the reaction cell has a substantially circular cross-section and wherein the membrane bisects the cross-section such that the anode electrode and the cathode electrode each comprise a substantially half-circle portion of the cross-section.

20. The energy storage system of claim 17, wherein the reaction cell is tubular and has an exterior flexible polymer sheath, wherein the membrane is tubular and has a radius less than a radius of the sheath, and wherein the cathode electrode and the anode electrode are coaxial relative to each other within the sheath and have the membrane therebetween.

* * * * *